(12) United States Patent
Merino Gonzalez et al.

(10) Patent No.: US 8,509,416 B2
(45) Date of Patent: *Aug. 13, 2013

(54) DYNAMIC COMMUNICATION LINE ASSIGNMENT

(75) Inventors: Jose Luis Merino Gonzalez, Malaga (ES); Pablo Alberto Sanchez Calvo, Madrid (ES)

(73) Assignee: Shoo 533 Limited, Berkshire (GB)

( * ) Notice: Subject to any disclaimer, the term of this patent is extended or adjusted under 35 U.S.C. 154(b) by 410 days.

This patent is subject to a terminal disclaimer.

(21) Appl. No.: 12/377,869

(22) PCT Filed: Aug. 20, 2007

(86) PCT No.: PCT/GB2007/003160
§ 371 (c)(1),
(2), (4) Date: Jun. 30, 2009

(87) PCT Pub. No.: WO2008/023154
PCT Pub. Date: Feb. 28, 2008

(65) Prior Publication Data
US 2009/0279538 A1    Nov. 12, 2009

Related U.S. Application Data

(60) Provisional application No. 60/822,931, filed on Aug. 19, 2006.

(51) Int. Cl.
*H04M 7/00* (2006.01)
(52) U.S. Cl.
USPC .................................. 379/221.01; 379/88.17
(58) Field of Classification Search
USPC .................. 379/88.22, 211.02, 211.01, 88.17
See application file for complete search history.

(56) References Cited

U.S. PATENT DOCUMENTS

2002/0054671 A1* 5/2002 Wiener et al. .............. 379/88.22
2002/0188680 A1   12/2002 McCormack et al.

(Continued)

FOREIGN PATENT DOCUMENTS

WO    WO 99/67922    12/1999
WO    WO 01/78336    10/2001

(Continued)

OTHER PUBLICATIONS

International Preliminary Report on Patentability and Written Opinion, dated Feb. 24, 2009, issued in priority International Application No. PCT/GB2007/003160.

(Continued)

*Primary Examiner* — Amal Zentai
(74) *Attorney, Agent, or Firm* — Saul Ewing LLP

(57) ABSTRACT

A system that enables a calling party to communicate with a called party over a communications network comprises: (a) a web page storage device that is operable to send, over the internet, (i) web pages to a calling party device, the web pages including a data entry screen into which a user enters a required telephone number or VoIP user name with which communication is sought and (ii) a call-in number; (b) a conversion device that is operable to receive over the internet, from the calling party device, the telephone number or VoIP user name and can cause the altering of call forwarding settings at a switch, such that a call from the calling party device to a call-in number will be automatically forwarded to a device associated with the telephone number or VoIP user name; (c) a dynamic line assignment module that can dynamically assign the call-in number.

18 Claims, 14 Drawing Sheets

(56) References Cited

U.S. PATENT DOCUMENTS

| | | |
|---|---|---|
| 2003/0147519 A1 | 8/2003 | Jain et al. |
| 2004/0104938 A1* | 6/2004 | Saraswat et al. ............. 345/764 |

FOREIGN PATENT DOCUMENTS

| | | |
|---|---|---|
| WO | WO 03/094432 | 11/2003 |
| WO | WO 2006/037166 | 4/2006 |

OTHER PUBLICATIONS

International Search Report, dated Feb. 19, 2008, issued in priority application No. PCT/GB2007/003160.

Low, "WebIn—An architecture for fast deployment of IN-based personal services," Workshop record, Intelligent Network, pp. 1-12 (Apr. 1996)—XP002043670.

Low, "The Internet Telephony Red Herring," HP Laboratories Technical Report, No. 96/98, pp. 1-15 (May 1996)—XP002043669.

* cited by examiner

FIG. 1
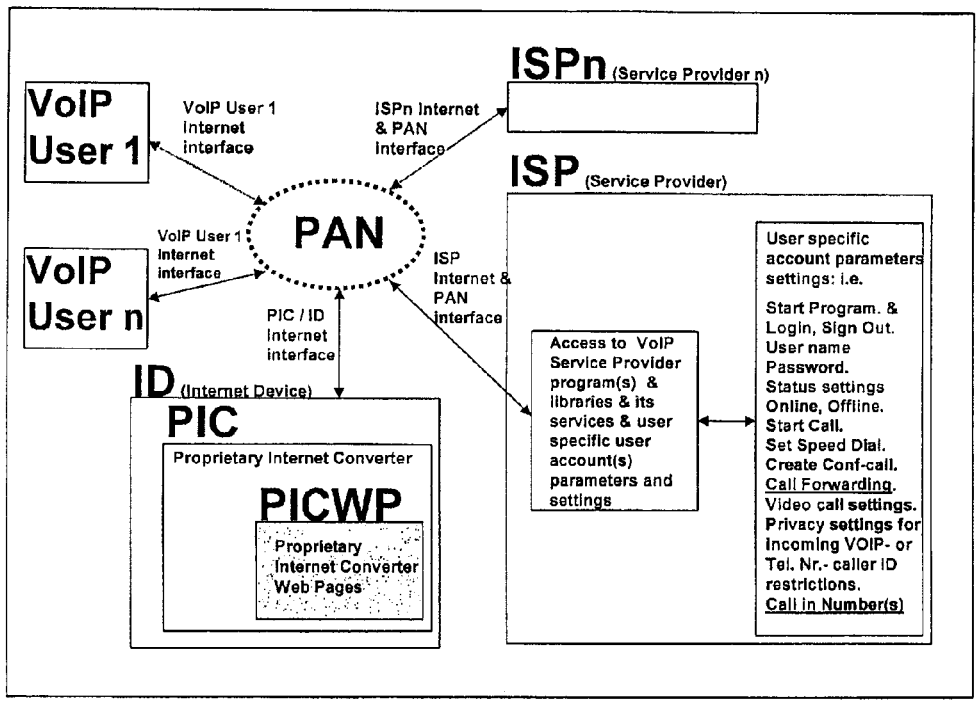
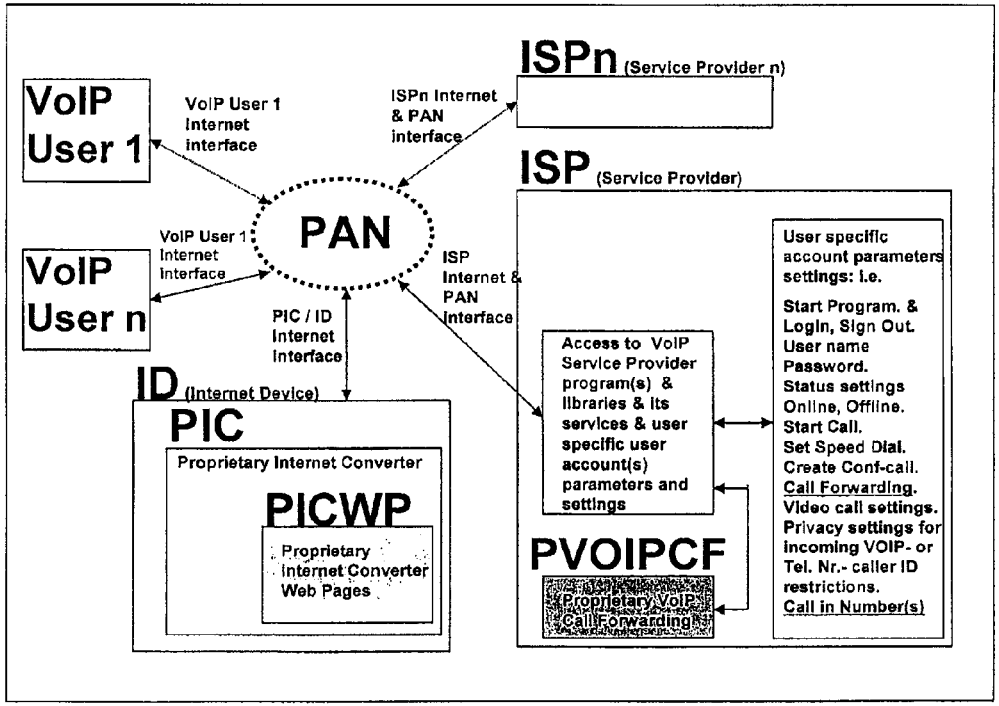
FIG. 2

DYNAMIC COMMUNICATION LINE ASSIGNMENT

CROSS REFERENCE TO RELATED APPLICATIONS

This application claims the priority of PCT/GB2007/003160, filed on Aug. 20, 2007, which claims priority to U.S. Provisional Application No. 60/822,931, filed Aug. 19, 2006, the entire contents of which are hereby incorporated in total by reference.

FIELD OF THE INVENTION

This invention relates to a system that enables a calling party to communicate with a called party over a communications network using an Internet conversion device and dynamic line assignment.

BACKGROUND OF THE INVENTION

Currently, most or all public and private switching networks (WN and FN) and private automatic branch exchange (PABX or PBX) can handle voice and/or data, allowing simplex and/or duplex call routing for voice calls, video calls and even data calls, such as open standard or proprietary VoIP (proprietary voice over internet protocol) calls. Some smaller call routers for private and small businesses can now handle call routing between the public switched telephone network (PSTN) and voice over internet protocol (VoIP) and vice-versa. However, there is often a requirement for a personal desktop or portable computer (PC) permanently connected to the internet. In some cases, there is even a requirement for an additional hardware call router devices (HWCRD) connected between the PC and PSTN (fixed land-line), typically interconnecting the additional HWCRD and PC using a universal serial bus (USB) interface. In some other cases, the HWCRD is basically a wireless device (WD) or mobile phone interconnecting and communicating with the PC through Wifi or Bluetooth; the WD has to be within a range of approximately 100 meters or less from the PC, mainly in order to run a third party or in-house proprietary VoIP application and to allow interfacing and in some cases even to power through such HWCRD. In other, more mass market technologies, the call routing is strictly interfaced by a PC permanently connected to the internet; the PC runs a third party or in-house proprietary VoIP application, allowing incoming voice calls from and to an external hardware device connected through a USB with the previously mentioned PC, which has to be permanently logged onto a user account from an internet service provider and permanently switched-on, (and hence connected to the mains power supply).

These various types of call router, jointly referred to as CR, require the originating calling party, for example a wireless device user, that wishes to be routed through to a VoIP user or a fixed or wireless phone user, to originate the call manually from a wireless device or mobile phone, fixed phone or VoIP phone. The user does this by calling the CR phone number associated with its connected PSTN, or the VoIP address associated with its VoIP phone. Then, when in voice call mode, the user follows pre-recorded voice instructions from the CR to enter manually first a security code and then the VoIP user address or PSTN phone number or wireless device phone number that it wishes to talk to. The same applies vice-versa, so that when a VoIP user calls the phone number associated with the PSTN connected to the CR, then, when in call (i.e. the voice channel is opened) the VoIP user has to select manually the outgoing call function, then check that it has sufficient credit and finally, following the CR instructions, the user has to enter the phone number to which it wishes to be routed through by the CR. These complexities limit the actual use of such systems to the more sophisticated or technology savvy users. And these systems fail to provide sufficient security provisions against abuse of these call router systems by unauthorised third parties. Another major drawback is that the user of such CR with an external HWCRD is typically connected in most cases to their home PSTN, thus occupying this communication link most of the time, preventing simultaneous use for example with one user using the PSTN and another user (perhaps in the same family) using his WD. Further, it is the WD that calls its home PSTN to set up call routing through the external hardware connected to its home computer; this home computer has to be permanently connected to the mains power supply and permanently logged on to a user account to allow permanently the running of a required application for the call routing function.

What is needed is a method that gives authorised users (with a user account accessible though the internet) the ability to choose, no matter where they are in the world, how to call any internet service provider user in the world. The present invention meets this need. Furthermore the calling party user has no need to have his own personal fixed home PSTN (phone line) nor a home computer, when it wishes to make outgoing calls or communications. The calling party can, in particular, set up calls from any wireless device capable of accessing the internet; these calls can be made to a called party with a VoIP user name.

SUMMARY OF THE INVENTION

The first aspect of the invention is a system that enables a calling party to communicate with a called party over a communications network. It is defined in Claim 1.

In an implementation, the system comprises:
(a) a web page storage device that is operable to send, over the internet, web pages to a calling party device upon request by the calling party device, the web pages including a data entry screen into which a user enters a required telephone number or VoIP user name with which communication is sought, as well as a command or instruction link that the calling party device understands which includes a call-in number;
(b) a conversion device that is operable to receive over the internet, from the calling party device, the telephone number or VoIP user name and can cause the altering of call forwarding settings at a switch or a switch interconnected to an internet service provider account, such that a call from the calling party device to the call-in number assigned to the calling party will be automatically forwarded to a device associated with the telephone number or VoIP user name; such conversion device also operable to send, over the internet, any such web pages from the web pages storage device to the calling party; and
(c) a dynamic line assignment module, embedded within the conversion device, that can dynamically assign a free call-in number of a switch as described in (b), which for a period prior to or at the time of communication by the calling party device with the conversion device as described in (b) was not assigned to any other calling party device. The free call-in number may be different each time the calling party device initiates a new communication with the dynamic line assignment module embedded within the conversion device.

Expanding on the above:
The calling party device can be assigned a specific call-in number by the dynamic line assignment module embedded within the conversion device that the device can dial into and that call is then automatically forwarded or diverted to the required contact details (typically telephone number or VoIP user name). More specifically, the conversion device converts an instruction from the calling party device to dial a specific telephone number or VoIP user name to instructions that the switch (or internet service provider account interconnected to the switch) can understand and act upon in order to set up call forwarding or call divert. It also dynamically assigns and sets up a call-in number for the calling party device to dial, which then leads automatically to a call being forwarded or diverted to the required telephone number or VoIP user name. The call-in number can be a local rate number or a zero cost number.

Hence, the conversion device may include the dynamic line assignment module and operates as an equivalent to a conventional call-set up procedure; the actual call is a standard voice call to the specified call-in number. Although this implementation is especially useful in enabling VoIP users to be reached, it can be used to reach any phone number, including any international phone number. Using this implementation to reach international phone numbers is useful because the calling party incurs just the cost of reaching the call-in number, which may be a local rate number.

'Dynamic' assignment of the call-in number means that the calling party does not have a fixed, permanently assigned call-in number. Instead, the call-in number is temporarily assigned and can be different each time a calling-party makes a call. The call-in number is selected from a large group of possible call-in numbers: for example, a switch may have a group of 50,000 such numbers; the dynamic line assignment module then locates a free, unused number from this group whenever it needs to assign a number to a calling party. Additionally the dynamic line assignment module could, in the event the switch is capable of handling multiple incoming calls for the same call-in number and is capable of separating the billing of each different calling party, then once a calling party is in communication through the call-in number, the dynamic line assignment module may decide to re-use the same call-in number for another different calling party wishing to communicate to yet another telephone number or VoIP user name.

The dynamic line assignment module can access the status of all call-in numbers and determine which are free and hence available for use. These numbers (e.g. in-use numbers) can be stored in a FIFO (first-in-first-out) to facilitate retrieval of free numbers.

After a fixed or programmable time period, the call forward/divert function can be removed from a call-in number so that it becomes free for re-use by the next calling party or by the same calling party for its next call request.

The approach of having a dynamic assignment of call-in numbers greatly reduces the total number of call-in numbers that the switch or conversion device needs to be able to have available for users of the system. Equally, for a given number of call-in numbers, far more potential calling-parties can be served, since only a small percentage will be using the system at a given time.

The calling party device can communicate over the internet with the conversion device that (i) receives the telephone number or VoIP user name and (ii) sends instructions to the switch to alter the call forwarding settings. The conversion device can then convert the protocols and instructions sent from the calling party device to a form that the switch or internet service provider account interconnected to the switch can correctly use. The web pages enable the calling party device to send instructions to the conversion device to initiate communications with the called party.

The conversion device can handle data to and from the calling party device and can also handle data to and from the switch or internet service provider account interconnected to the switch. It acts as a form of middleware, converting protocols used by the calling device to a form suitable for the switch or internet service provider account interconnected to the switch to act upon.

The switch itself or internet service provider account interconnected to the switch usually hosts the user account of the calling party. The calling party therefore has a user account associated with the switch or internet service provider account interconnected to the switch and the call forwarding or call divert settings are those of that user account. The switch or internet service provider account interconnected to the switch uses the instructions from the conversion device to alter the calling party's user account. The switch can be part of an ISP (Internet service Provider) infrastructure that controls the calling party's user account. The conversion device with or without a dynamic line assignment module can also be part of an ISP infrastructure that controls the calling party's user account. The calling party uses a specific ISP which can be the same ISP as the called party, but does not have to be: it can be different from the ISP of the called party.

The conversion device with or without a dynamic line assignment module and the can reside in a secure internet server and may include the web pages storage device. The conversion device can also identify and authenticate a calling party and reject a communication request from a calling party that is not recognised or authorised to use the conversion device. The conversion device may be able to interface with another conversion device to set up a chain of conversion devices in order to link the calling party to the called party. The conversion device may be able to interface with another web pages storage device to set up a chain of web pages storage devices in order to link the calling party to the called party. The conversion device may be able to interface with several other conversion devices and several web pages storage devices to set up a chain of conversion devices and web pages storage devices in order to link the calling party to the called party.

The calling party device can be a mobile telephone; it can include an internet browser but is not directly capable to dialing a VoIP user name. The calling party device is selected from the group: fixed device; desktop or portable computer; wireless device; VoIP device.

The switch includes a supplementary module specifically for VoIP call forwarding. This is necessary if the switch does not have a built-in module for performing this function.

The calling party can send data, voice or video to the called party using this invention, because in essence the conversion device strictly handles the signalling between the calling party and a switch, whilst the actual communication between the calling party and the called party is made through a standard phone call by the calling party to the switch call-in phone number that the called party is call forwarded or call diverted to.

Another aspect is a method of enabling a calling party to communicate with a called party over a communications network, the method comprising:

(a) sending, over the internet, web pages to a calling party device, the web pages including a data entry screen into which a user enters a required VoIP user name or telephone number with which communication is sought;

(b) receiving over the internet, from the calling party device, the VoIP user name or telephone number;

(c) altering call forwarding or call divert settings at a switch, such that a call from the calling party device to a call-in number will be automatically forwarded or call diverted to a device associated with the VoIP user name or telephone number;

(d) dynamically assigning the call-in number.

This method may also include sending, over the internet, web pages to a calling party device, the web pages including a dynamically assigned call-in phone number which has been forwarded to the required VoIP user name or telephone number with which communication is sought.

A further aspect is a wireless device when displaying a web page received from a remote device, the web page including a dynamically assigned call-in phone number which has been forwarded or diverted to the required VoIP user name or phone number with which communication is sought, the wireless device being programmed, such that the wireless device user can cause a call from the wireless device to be automatically initiated to the phone number that forwards or routes to the VoIP user name or phone number.

An example will expand on this and explain the user interaction process.

Step 1. The mobile phone etc. user enters, into his internet web browser, a URL (Uniform Resource Locator) for the service offering the present invention.

Step 2. A web-page is sent by the conversion device to the mobile phone. The web page includes a simple window into which the user enters the VoIP user name he wishes to contact, plus a 'Send' button.

Step 3. The mobile phone user enters the VoIP user name it wishes to communicate with (e.g. "Smith69") and then clicks on the "Send" button. The link "Send" displayed on the web page is in a language the mobile phone web-browser understands; selecting it causes the device to send the entered data (VoiP user name) to the conversion device.

Step 4. The conversion device extracts the "VoiP user name" and causes a specific ISP user account to call forward a specific dynamically assigned call-in number associated to that specific user account to the VoIP user name the mobile phone user wants to communicate with.

Once this process between the conversion device and the ISP (ISP connected to a switch), is done, then the conversion device will reply back to the handset with a different web-page requesting confirmation by the mobile phone user with a command link ("wtai://wp/mc;DynamicallyAssignedCallInNumber") embedded in the link not visible to the mobile user except for the visible link text "Call Smith69 now?".

Step 5. When the mobile phone user clicks on the confirmation link "Call Smith69 now?" it will cause the mobile phone to execute the command embedded in the link and dial the dynamically assigned call-in number embedded in the command. This is because the confirmation link actually is a command converted by the conversion device and sent through a reply Web-page which the mobile phone understands. In this specific case, when clicking on the confirmation link, the mobile phone will understand the following command: "wtai://wp/mc;+442081443550", which in this example will cause the mobile phone to dial automatically the phone number "+442081443550" which is the dynamically assigned call-in number forwarded or diverted just previously to the VoIP user name "Smith69". More generically, the command is:

"wtai://wp/mc;CallInNumber".

The conversion device can also send to the calling party device a specific page with a list of settings the calling party user may cause to change (e.g. call-forward, username and password, activate caller-ID, set online status) at the ISP user account or switch or simply send to the ISP user account or switch (i.e. username and password, remove call-forward, conference call). The internet converter will convert such selected setting to a language that the ISP or switch understands and cause it to permanently or for a predefined time period set or change such setting.

In an implementation, there is a "proprietary internet converter" (PIC). One of the core functions of the PIC is to allow a calling party end-user device with internet access (e.g. a mobile telephone) to initiate voice communication with a called party VoIP end-user device. To do so, an ID (Internet Device), (e.g. a Server with a built-in PIC) needs to convert the protocols used by the calling party end-user device so that the switch that routes calls to the called party VoIP end-user device can understand the instructions sent from the calling party end-user device. The switch has a call forwarding function. The calling party gives the calling party user name (e.g. ISP user name/contact or VoIP user name/contact) to the PIC over the internet. The PIC then sets the call forwarding function on the switch, for that particular calling party, so that an incoming call from the calling party is automatically forwarded to the ISP user or VoIP user defined by the calling party.

The PIC is accessible to users of any devices that can access the internet and which have an associated "internet device" and/or "internet service provider" user account. The user account should have (i) at least one or more dynamically assigned call-in numbers and call forwarding or call divert functions from its call-in number(s) to any of its corresponding "internet service provider users". The call forwarding or call divert function may be performed by an "internet device" and/or "internet service provider" for each of their individual accounts. Alternatively, it may be performed or by a "proprietary voice over internet protocol call forwarding" module or system embedded into such "internet device" and/or "internet service provider"; the module is capable of enabling, setting and disabling each of the individual accounts' call forwarding or call divert settings.

The PIC can host "proprietary internet converter web pages" (PICWP). These are sent to the calling party and displayed on the calling party's device. They provide a simple graphical user interface into which the calling party can enter the called party' user name. Providing PICWPs to the calling party's device removes the need to download any application to that device.

This invention provides the advantage of allowing any fixed or wireless device, capable of accessing the internet, to communicate with any voice over internet protocol user of any internet service provider.

Moreover this invention provides the advantage of allowing any fixed or wireless device, authorised to make use of the PIC and/or PICWP functions and capable of connecting and communicating with the internet, to communicate with all associated internet service provider (ISP) specific users with whom the fixed or wireless devices users have an account with. It therefore enables any fixed or wireless device to be able to connect and communicate with all ISP users, meaning any user that is logged into his account on any PC anywhere in the world. Or, if he is not logged in but has forwarded his incoming calls to a voice mail then the fixed or wireless device can connect and communicate with his voice mail. If he has his incoming calls diverted or call forwarded to a phone number then, the connection and communication can be to that phone number. If he has his incoming calls diverted or call forwarded to another different ISP user then the connection and communication can be to that different ISP user.

This ability to interconnect any fixed or wireless device and PIC, respectively controlled and interfaced by a PICWP and the associated internet service provider, is particularly advantageous for wireless devices' international outgoing data and/or voice and/or video call routing. Currently, freedom of routing choice is restricted by the wireless networks, but this choice is now, with this invention, fully in the hands of the end user of any fixed and wireless device user, capable of accessing the internet (even where access is at very low bit-rates), by using the services provided by a PIC and/or PICWP, which communicates with a ISP. Wireless networks typically only allow calls to any phone number or any "Uniform Resource Locator" (URL) but do not allow one to actually call to any ISP user or ISP user names or VOIP user names, but with this present invention all fixed and particularly wireless device users will now be able to additionally call to any associated ISP user names or VoIP users as described within this invention, thus being able to access hundreds of millions of VoiP users around the world. Previously, these hundreds of millions of VoIP users were not accessible to most wireless device users around the world, in particular to those wireless device users who make use of a so called cheap or low to mid-range wireless phone without the need to download or embed any application on their wireless device. These phones form the bulk or majority of wireless devices or wireless phones or mobile phones used around the world.

The PIC and/or the PICWP could reside in an ISP or the PIC could reside in a secure internet server (SIS) with duplicated server and power cut off protection back-up; the PICWP could reside in an internet device (ID) or desktop computer (PC).

The present invention is especially useful for those users with no PSTN connection but who do have a wireless device and wireless coverage from (i) a public or private wireless system or Wireless Network (WN) and/or (ii) public internet access points through a PC and/or (iii) public PSTN phone(s) access points.

As wireless coverage by cellular networks is available almost world-wide and mobile phone penetration is very high (in some countries even outstripping the penetration percentage of fixed phone users), the present invention addresses a real need and demand—particularly enabling mobile handset users to make outgoing calls from their mobile phones at any time and in any place with mobile coverage, calling to any place in the world, to any voice over internet protocol user of any internet service provider, and at the worst case at the cost of only one-local call rate (or even free of charge in some cases depending on his WN tariff plan). There is no need to leave a home computer permanently switched on or permanently running any applications, and furthermore the present invention requires only that the wireless device or mobile phone be used in the same way as the user has always used it. The previous advantages may also apply when, instead of calling any voice over internet users (VoIP user), one calls any phone number. A further advantage is that the wireless device, mobile phone, or PC does not have to download any application whatsoever but simply downloads a conventional web (or WAP) page. Instead, at no extra charge, the end-user is able to call any VOIP user associated with its internet service provider and simply has either to pay his WN for a local call rate or subscribe to an internet service provider that makes use of this invention; the internet service provider may charge a small fee for the benefits of this invention.

A final aspect is a method of enabling a calling party to communicate with a called party over a communications network, the method comprising:

(a) sending, over the internet, web pages to a calling party device, the web pages including a data entry screen into which a user enters at least two different contact details, meaning one of a party with which communication is sought (called party), AND a conventional or international phone number;

(b) receiving over the internet, from the calling party device, both the contact details, of the called party AND the conventional or international phone number;

(d) altering conference call settings at a switch or at an internet service provider interconnected to a switch, such that a conference call will be automatically initiated by the switch between the party with which communication is sought (called party) AND the conventional or international phone number.

(e) the conversion device when receiving only the called party contact details and the other entry data field being empty, capable of replacing the empty data field by a default phone number, which may be the calling party mobile-, home-, or office-phone number and then provide those two to the switch.

This method may be performed by a system as defined previously.

In a related, final aspect, there is a wireless device when displaying a web page received from a remote device, the web page displaying a web page received from a remote device, the web page including an entry field for a VoIP user name (called party) or telephone number (called party) it wishes to communicate with AND a different entry field for a telephone number (conventional or international phone number) with whom to conference with, the wireless device being programmed, such that the wireless device user can cause a conference call from the wireless device to be automatically routed by a remote conversion device by simply clicking on a SEND key on the entry web page.

BRIEF DESCRIPTION OF THE DRAWINGS

FIGS. 1, 2, 3 and 4 show one example each of an implementation and integration of a "proprietary internet converter" (PIC) and "proprietary internet converter web pages" (PICWP). The PICWP is a sub-part of or embedded into a PIC, and the PIC may be built-into an internet device (ID) or an internet service provider (ISP) device communicating through a PIC interface and/or ID internet interface and/or ISP internet interface. The PIC may communicate with or through a public access network (PAN) and with an internet service provider (ISP and ISPn) and any other device, be it a voice over internet protocol user (VoiP User1, VoIP User n) or any portable computer- and/or, fixed- and/or wireless-device capable of accessing the internet even at low bit rates.

The implementation, integration or flowcharts of the PIC and/or PICWP and/or PVoIPCF may comprise all of the shown sub-modules and/or sub-routines and/or sub-flowcharts and/or implementation examples or any single or multiple combination or addition thereof or an equivalent of each such sub-module and/or sub-routine and/or sub-flowchart and/or implementation performing a similar function within the overall method of this invention, without limiting any such other ways of implementing the PIC and/or PICWP and/or PVoIPCF as described within the claims of this invention.

Figure 3:
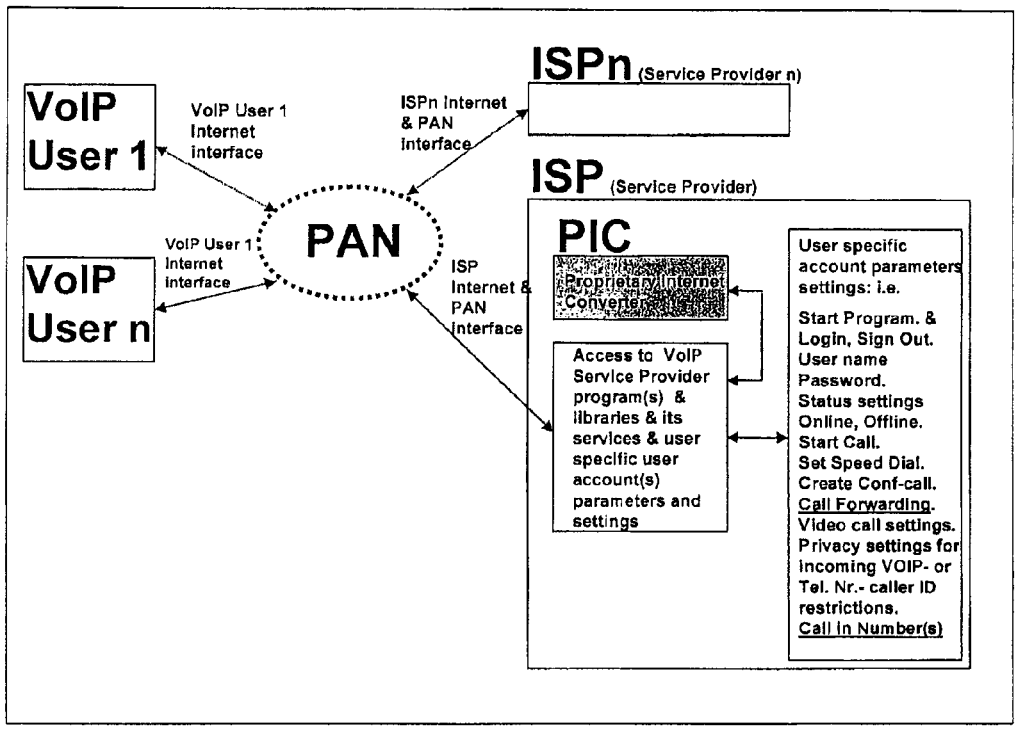
Figure 4:
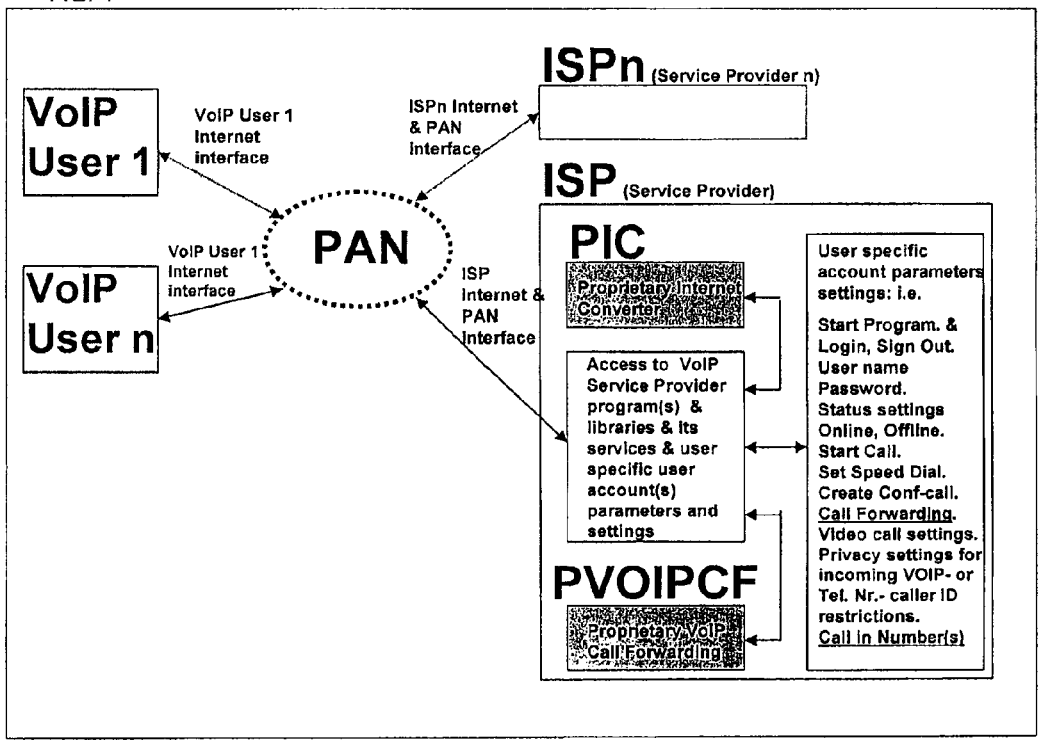
Figure 5:
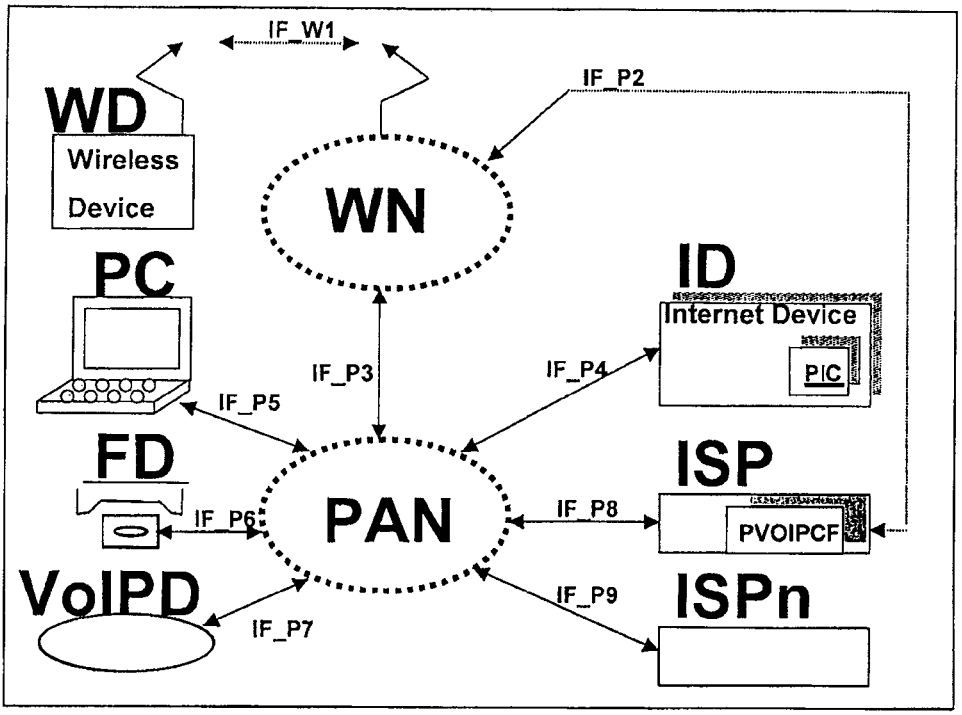
FIGS. 5, 6, 7 and 8 are examples of implementations and combinations, in accordance with the present invention, with respect to some of the different internet service providers (ISP), wireless networks (WN) and public access networks (PAN) architectures, and any such devices within such embodiments that are capable of accessing the internet and/or capable of making calls. Examples include desktop or portable computers (PC) and/or fixed devices (FD) connected with or to a PAN and/or ISP, voice over internet protocol devices (VoIPD) associated with a PAN and/or ISP, wireless devices (WD to WDn) associated with a WN.
Figure 6:
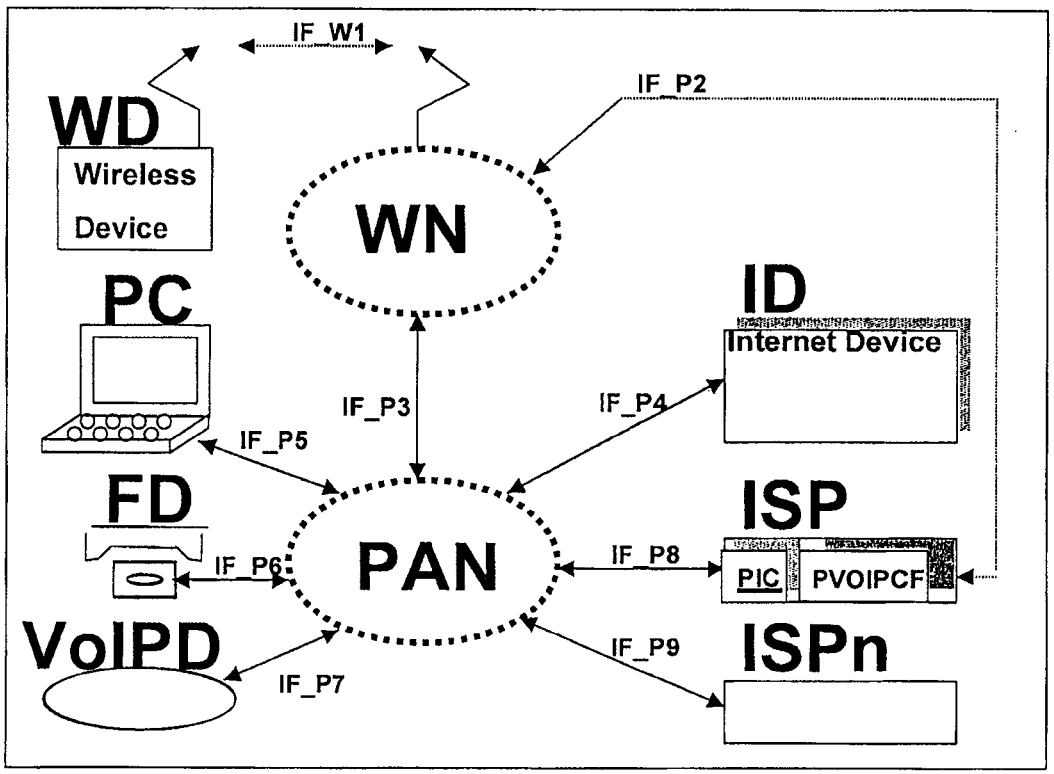
Figure 7:
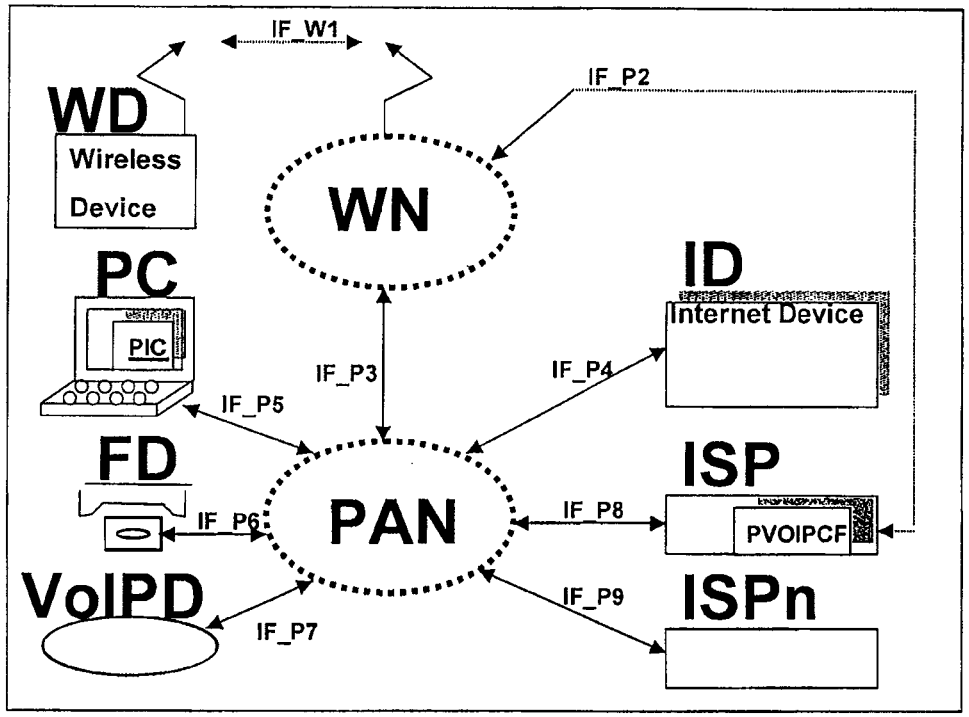
Figure 8:
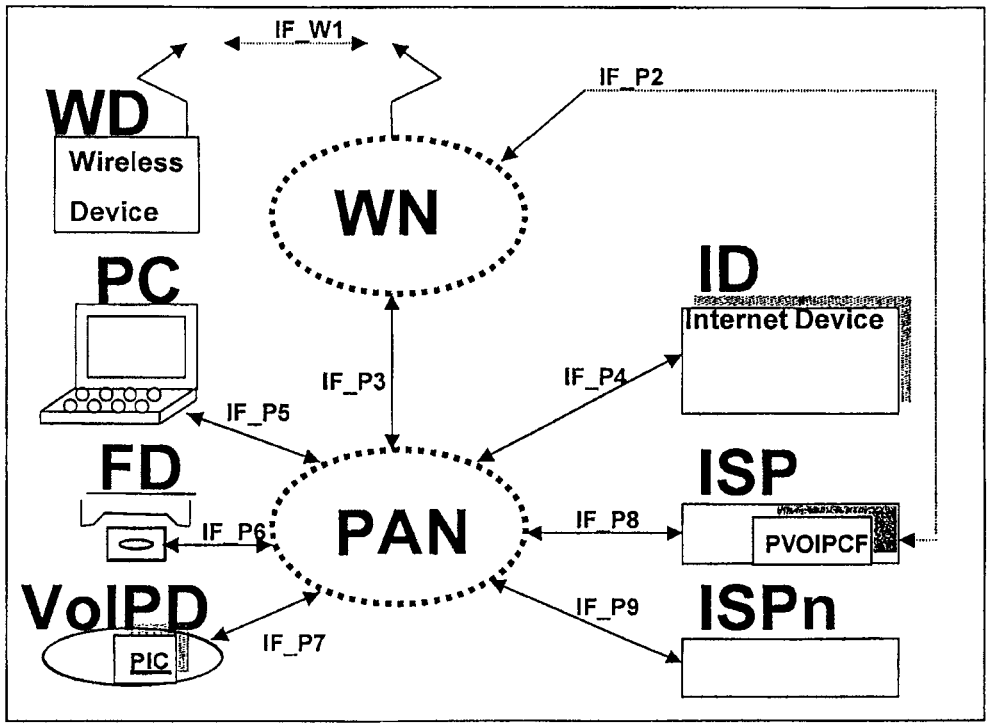
Figure 9:
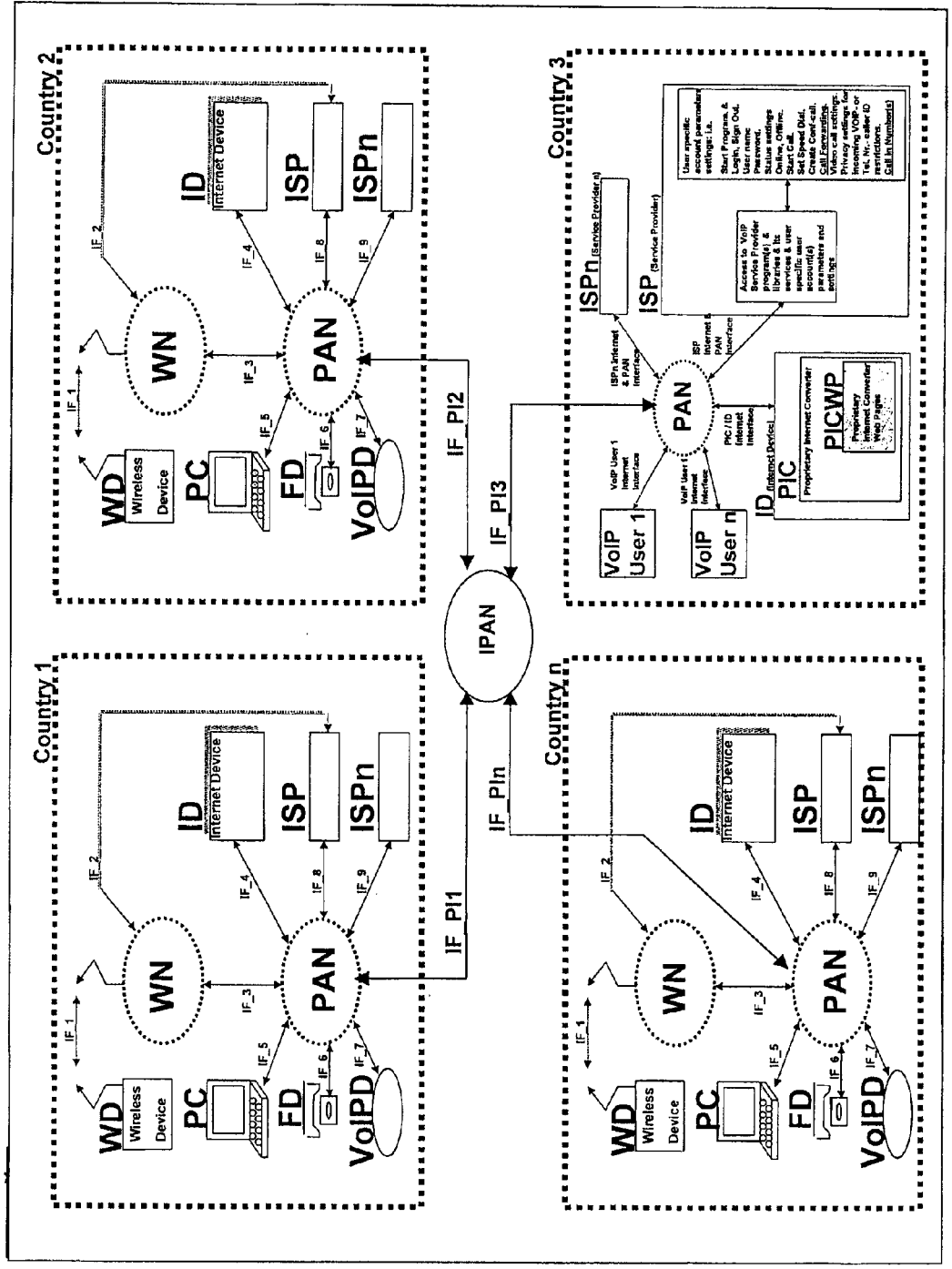
FIGS. 9 and 10 show two examples of an implementation, integration and some of the different combinations in accordance with the present invention with respect to the proprietary internet converter (PIC), with build-in proprietary internet converter web pages (PICWP) and the proprietary voice over internet protocol call forwarding (PVoIPCF) module, within the scope of a multi country or region architecture or implementation. The PIC and/or PICWP and/or PVoIPCF may include any single or multiple combination thereof or an equivalent of each such function or addition performing a similar function within the overall method of this invention, without limiting any such other ways of implementing the PIC and/or PICWP and/or PVoIPCF as described within the claims of this invention.
Figure 10:
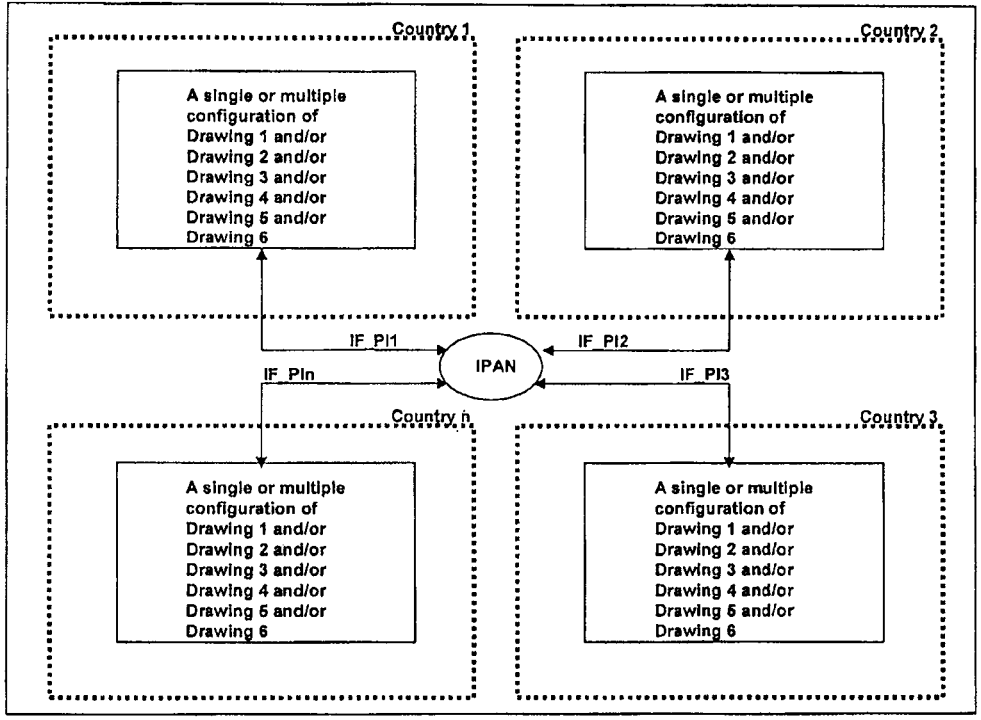
Figure 11:
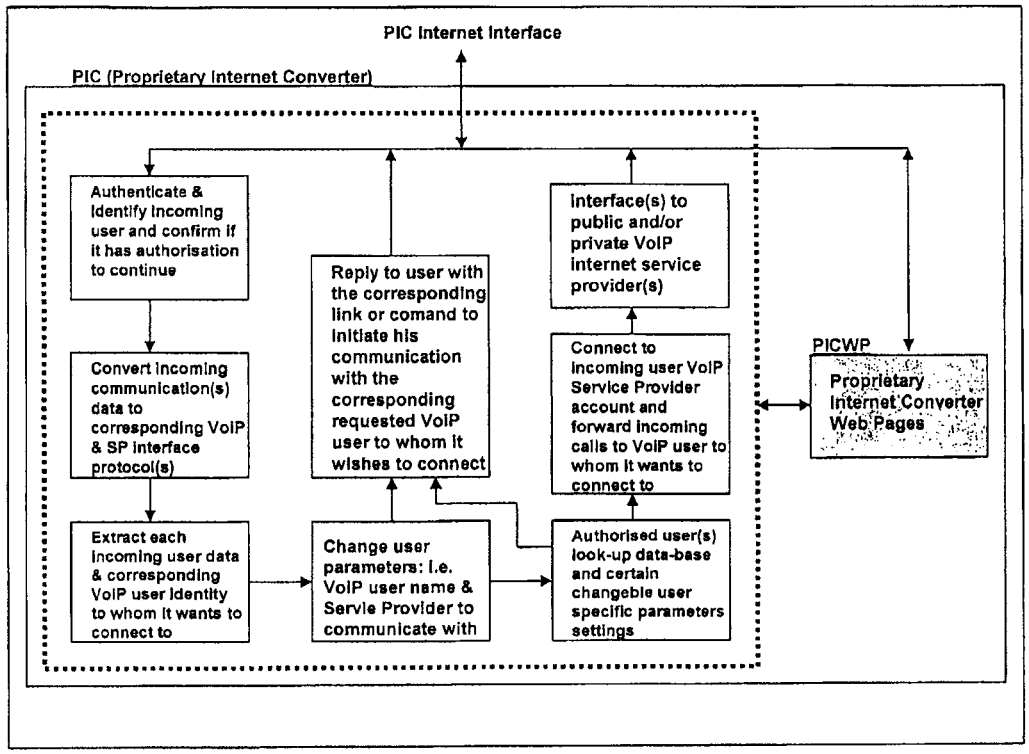
FIGS. 11, 12 and 13 show one example of the implementation, integration and some of the different combinations of the proprietary internet converter (PIC) flowchart as shown in FIG. 11. The proprietary internet converter web pages (PICWP) are expanded as shown in FIG. 11. One of the possible implementations or flowcharts of the proprietary internet converter web pages (PICWP) is shown in FIG. 12, and one of the possible implementation or flowcharts of the proprietary voice over internet protocol call forwarding (PVoIPCF) is shown in FIG. 13.
Figure 12:
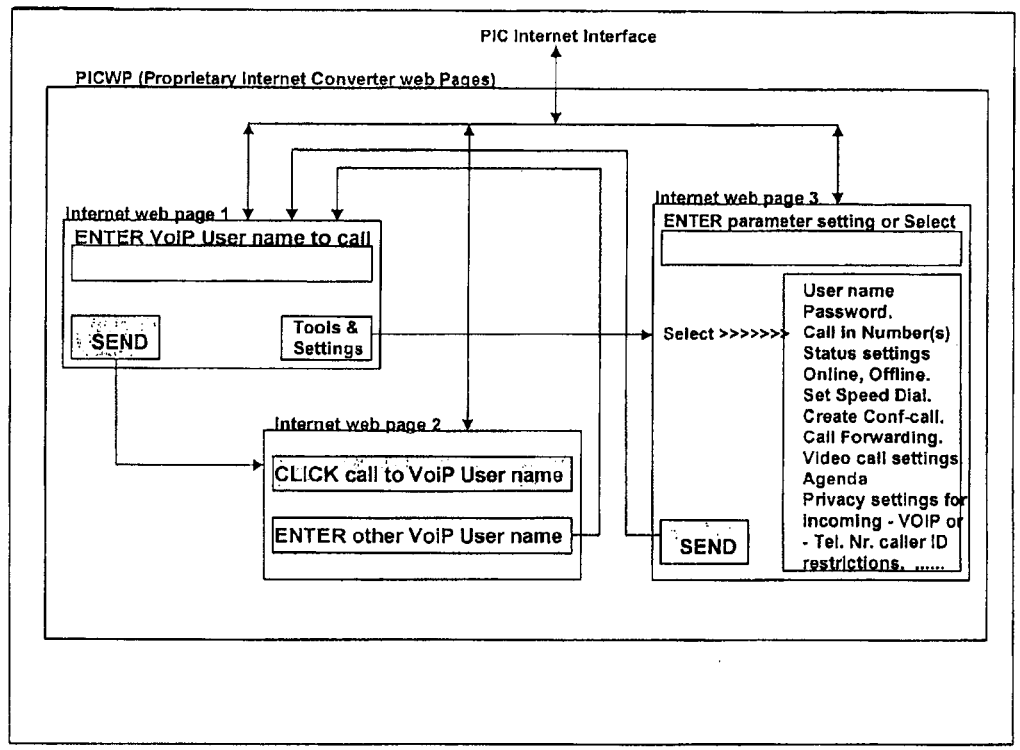
Figure 13:
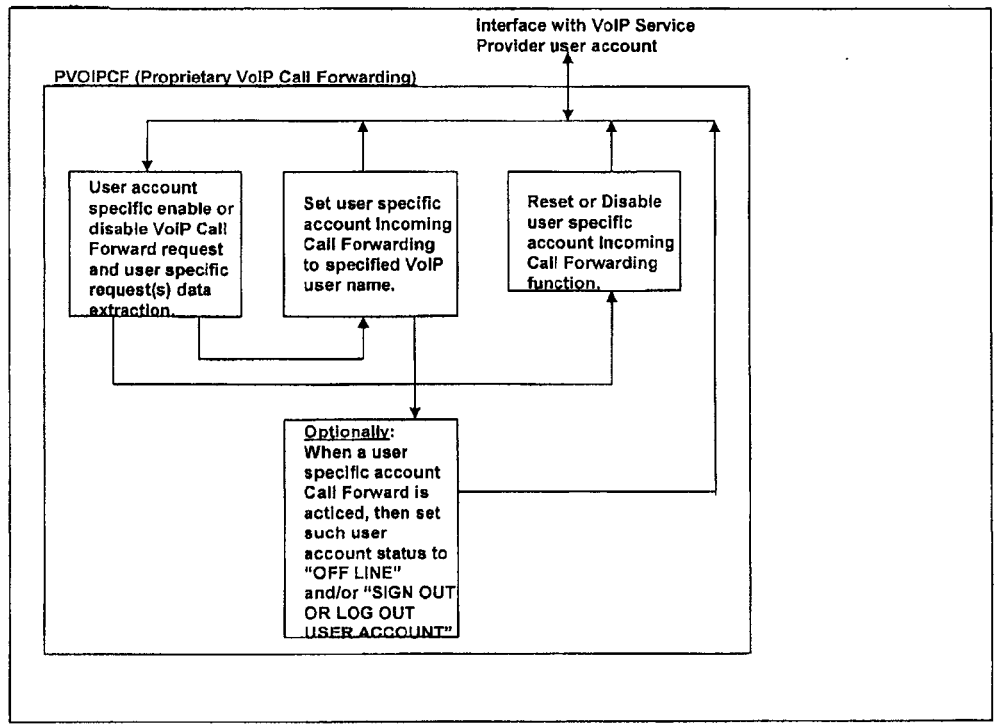
Figure 14:
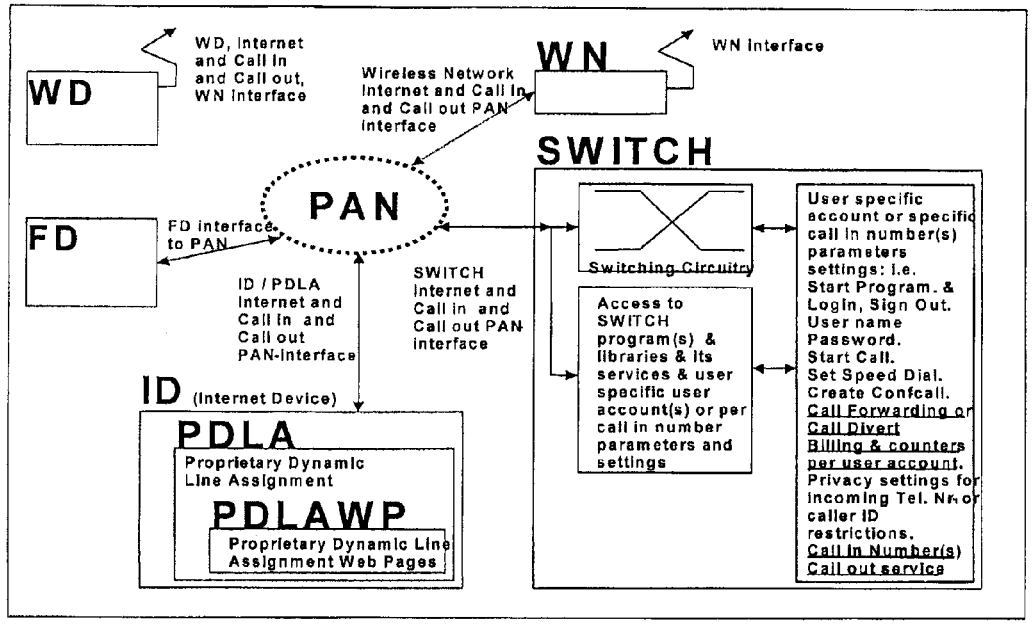
Figure 15:
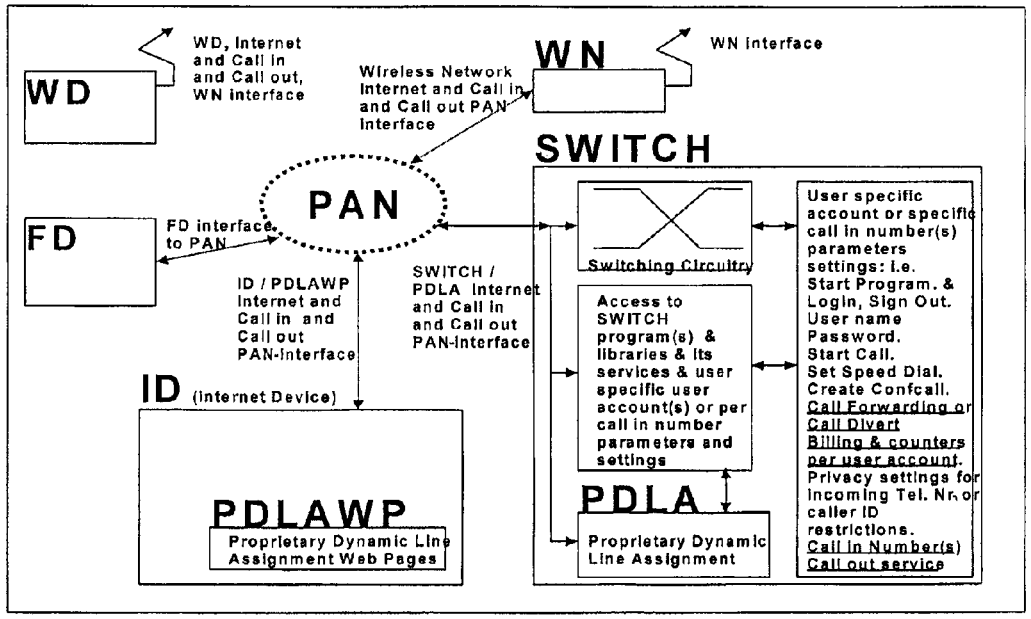
Figure 16:
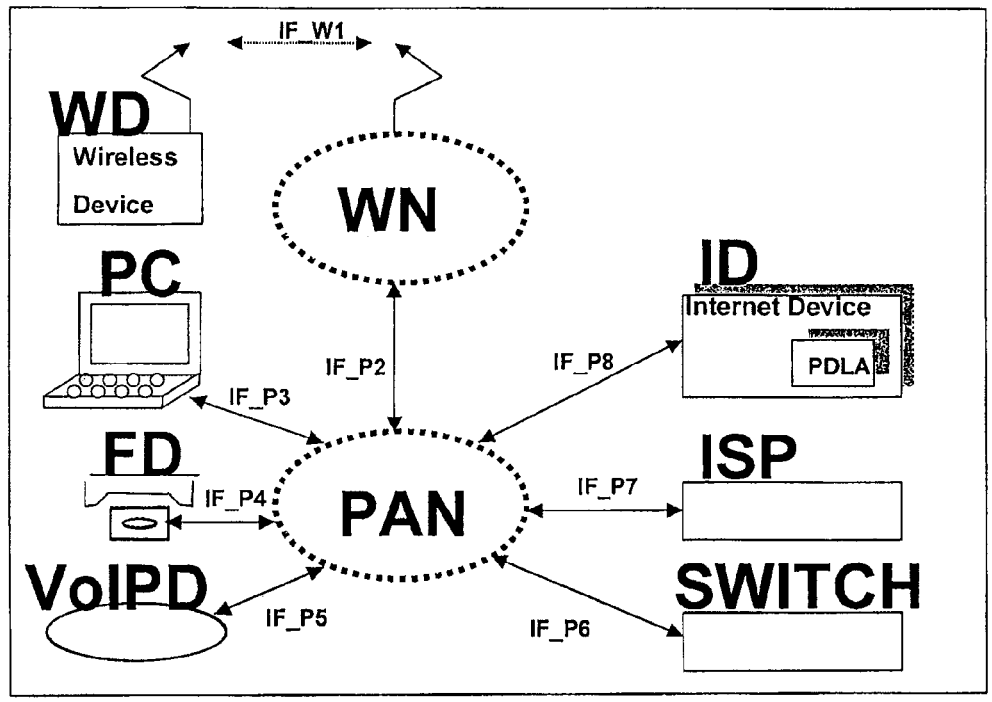
Figure 17:
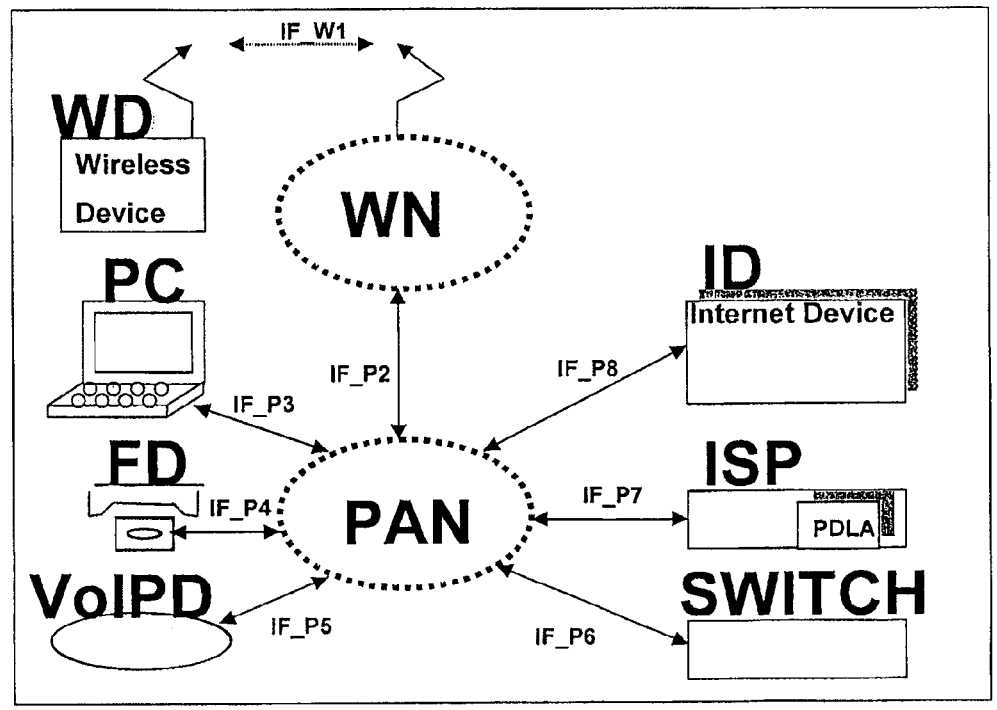
Figure 18:
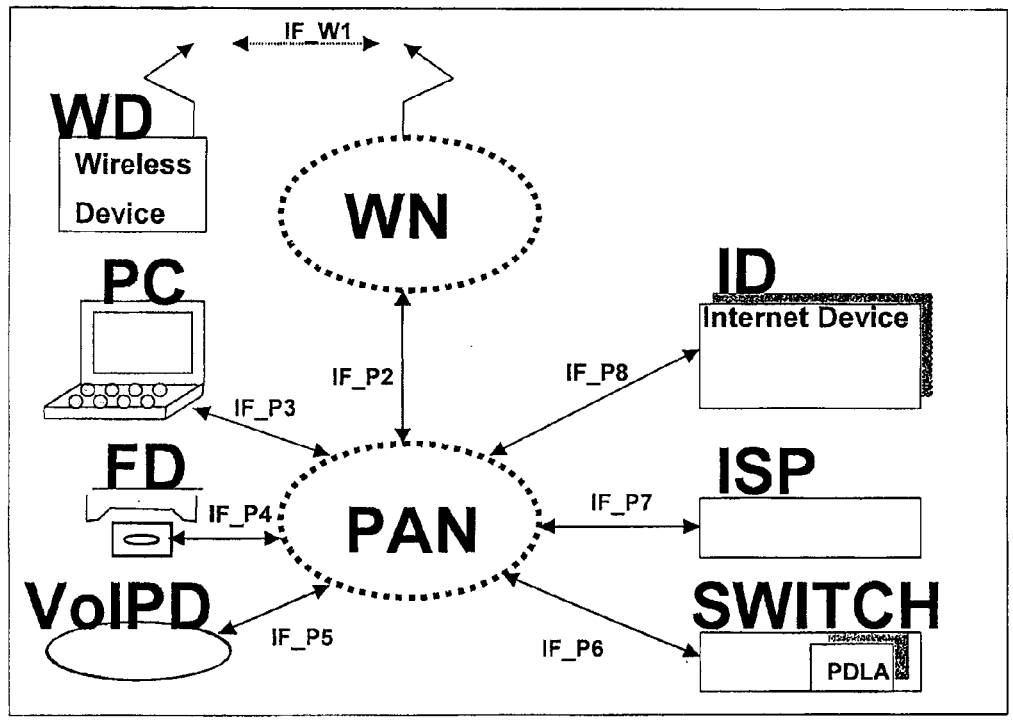
Figure 19:
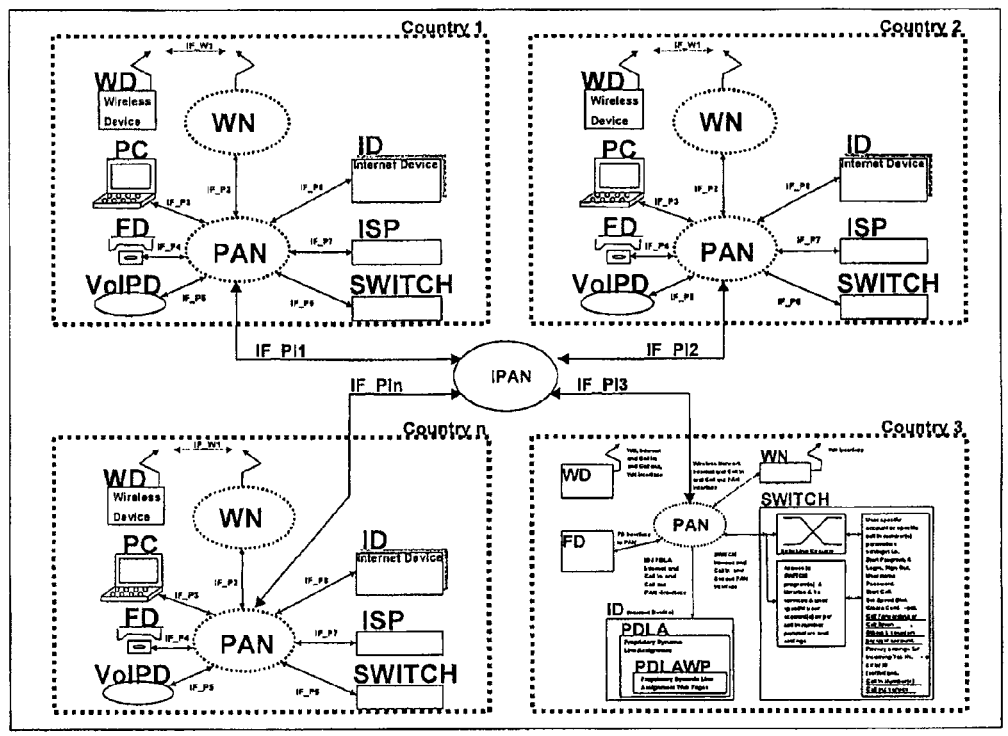
Figure 20:
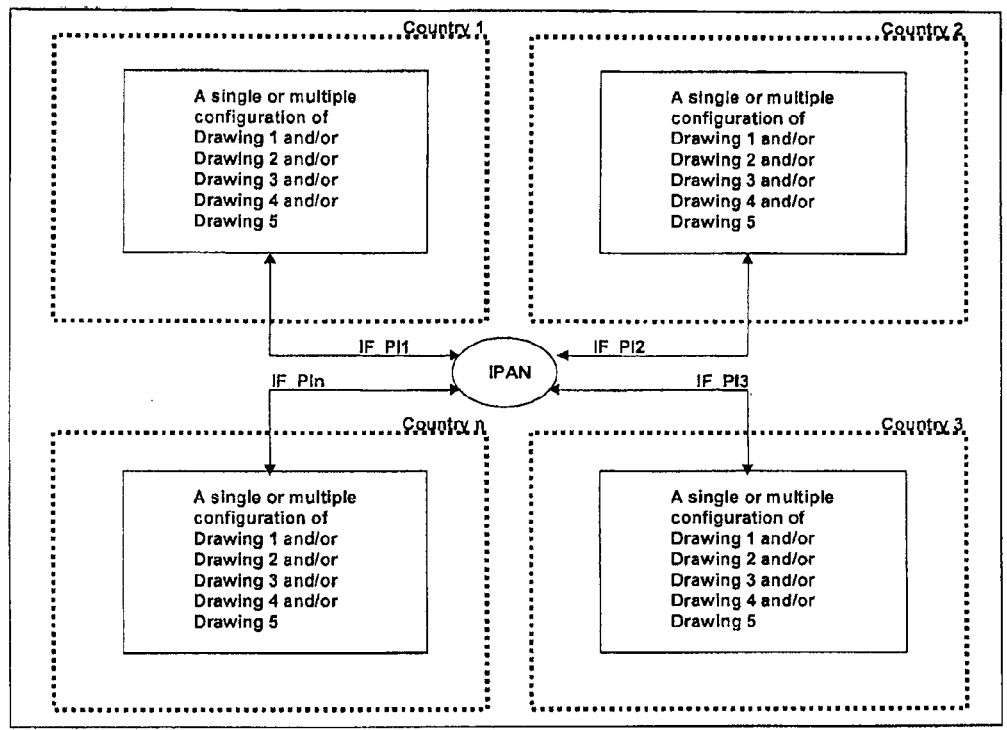
Figure 21:
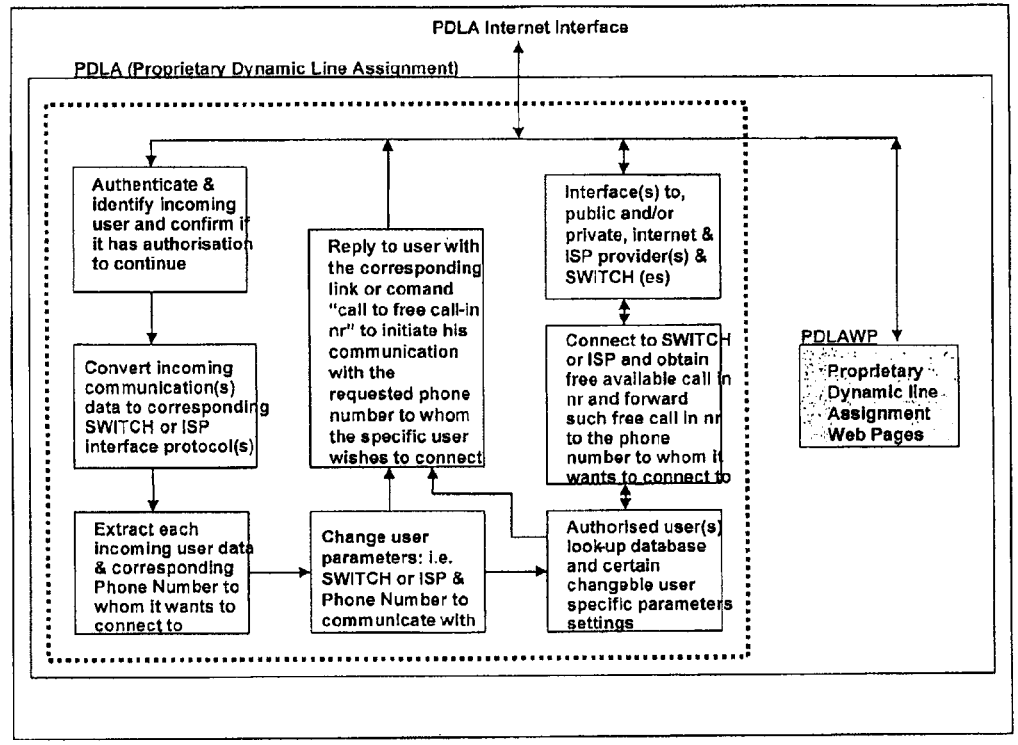
Figure 22:
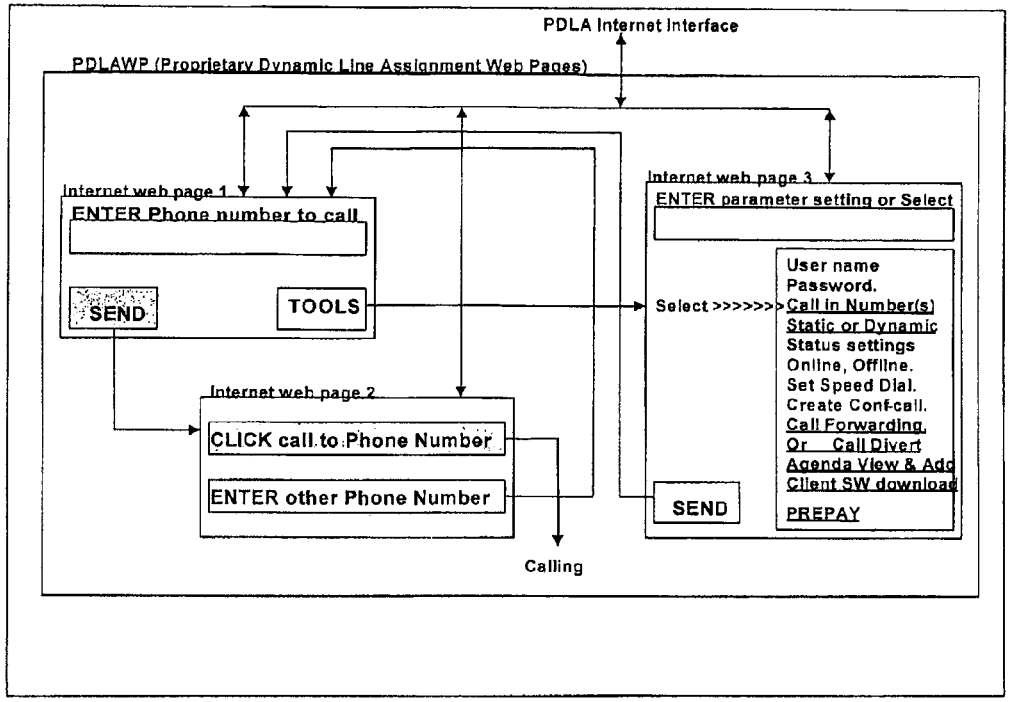
Figure 23:
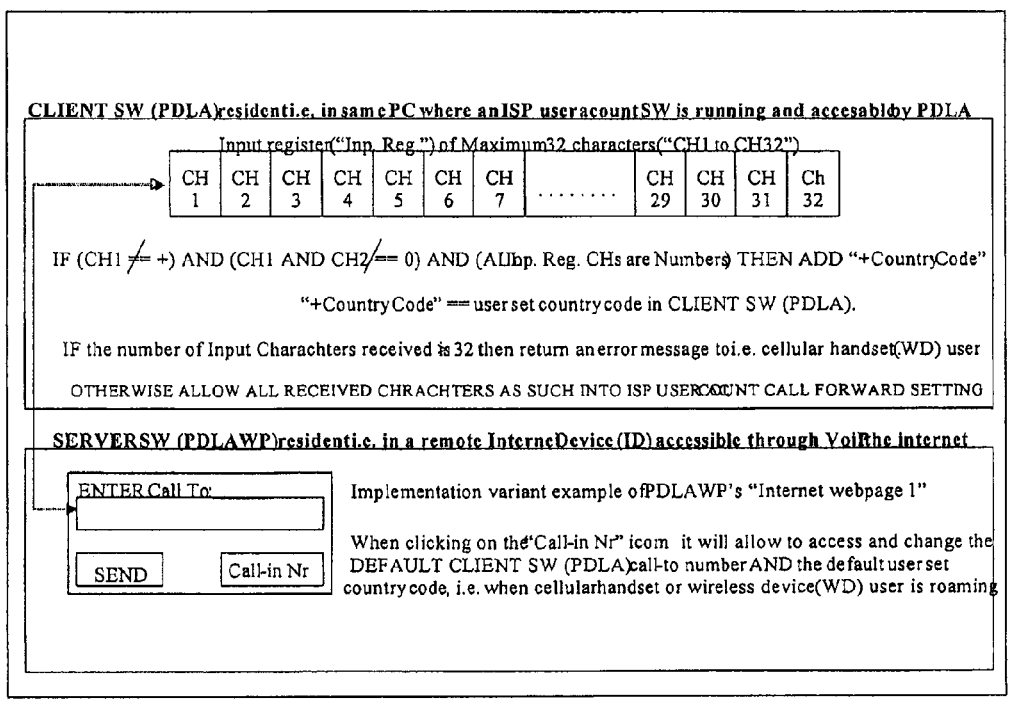
Figure 24:
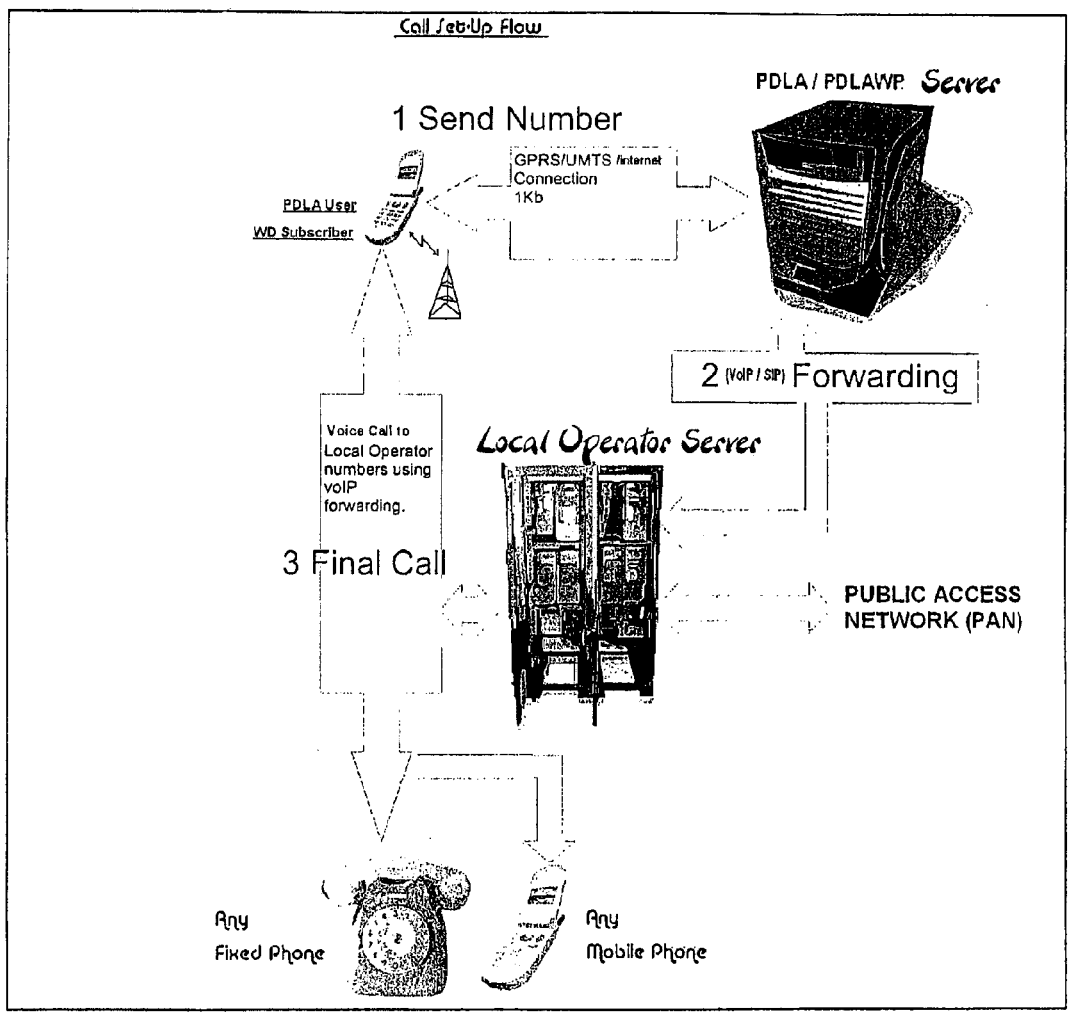
Figure 25:
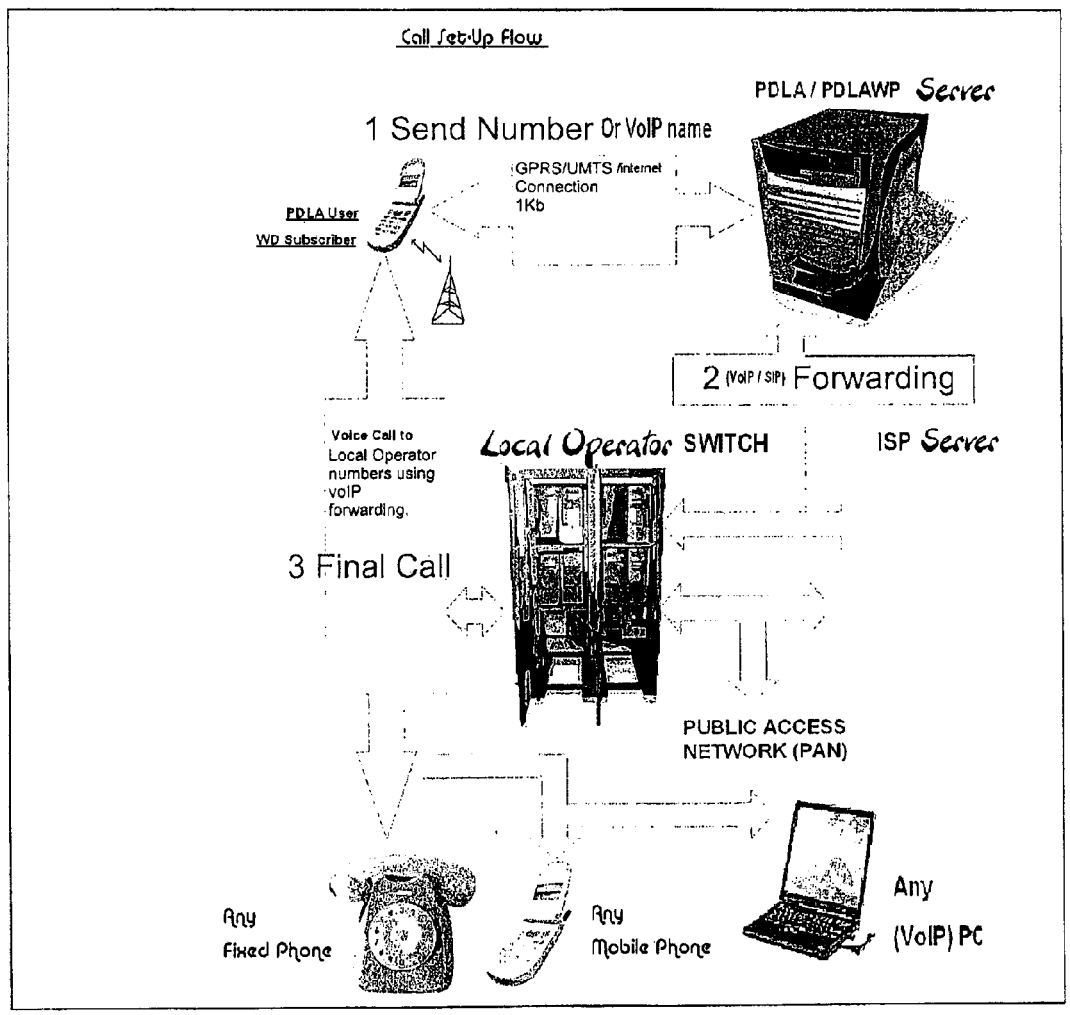

FIGS. 14-25 schematically depict the operation of a similar system and method in accordance with the present invention; Appendix 1 describes these in more depth.

DETAILED DESCRIPTION

Various implementations of the present invention will be described in detail. All include an internet device (ID); the term 'internet device' or ID should be expansively interpreted to mean any device that has at least one or more built-in proprietary internet converters (PIC). The core function of the PIC is to allow a calling party end-user device with internet access such as a mobile telephone, to initiate voice communication with a called party VoIP end-user device. The term 'internet' includes the wired and also the mobile internet, such as but not limited to WAP, GPRS, EDGE, IMode. The ID needs to convert the protocols used by the calling party end-user device so that the switch that routes calls to the called party VoIP end-user device can understand the instructions sent from the calling party end-user device. The switch has a call forwarding function. The calling party gives the calling party user name (e.g. ISP user name/contact or VoIP user name/contact) to the PIC over the internet. The PIC then sets call forwarding function on the switch, for that particular calling party, so that an incoming call from the calling party is automatically forwarded to the ISP user or VoIP user defined by the calling party.

Each PIC has at least one or more built-in proprietary internet converter web pages (PICWP). These web pages are downloaded to a calling party end-user device and provide a simple graphical user interface which allows an end-user to (i) provide the PIC with information defining the called party device and (ii) send instructions to the PIC to initiate voice communications with the called party device. Although the PIC will typically store these web pages internally, each PIC could instead be remotely connected to the PICWP. Each PIC has one or more user accessible input interfaces, such as an internet protocol (IP) address or web-site address or URL. The PIC is capable of detecting any single (or simultaneously, any multiple) inbound communications request and is also capable of communicating with any single calling party device (or simultaneously with any multiple devices). The calling party devices are capable of accessing the internet in the normal way; these device can be a fixed device (FD), desktop or portable computer (PC), wireless device (WD), voice over internet protocol device (VoIPD) or any such other device capable of communicating (i) through an internet service provider (ISP) or (ii) with an internet device (ID) or (iii) with a public access network (PAN) or (iv) with a wireless network (WN). The PIC is also capable of identifying any individual device end-user and is capable of rejecting a communications request from a device end-user if that user is not authorised or recognised as an authorised end-user of the PIC functions.

Once a calling party end-user is detected as an authorised user, then the PIC will detect the inbound communications protocol from that end-user's device. It will communicate with that device through one or more input/output interfaces. The PIC will also convert the calling party inbound communications protocol requests, commands and parameters settings to the outbound communications protocol(s) required to allow the PIC to interface and communicate with each corresponding calling party user account. Such user accounts can reside in a ID, ISP, PC, VoIPD (or in any other switching device connected to the internet and in which a specific user account and its parameters settings reside). Such a user account is associated with a specific internet service provider and each of its unique user name(s) (commonly referred to as a user specific voice over internet protocol user name). The ID or ISP or PC or VoIPD etc. that stores the calling party user account must however have a call forwarding or call divert function that includes forwarding or diversion to another VoIP user name. If it does not, then, a module or system providing this routing facility should be provided; this is called a proprietary voice over internet protocol call forwarding (PVoIPCF) function and is accessible by the PIC.

To illustrate the proprietary internet converter (PIC) functionality, say one calling party end-user originates its communication from a mobile telephone (WD) or a desk top computer (PC) which accesses the PIC (through its webbrowser) with a user-specific assigned internet protocol address. The PIC first checks if such a calling party end-user is an authorised user, and if it is not, the PIC will reject the communication. But if it is authorised, it will allow access and send back to the WD or PC user a PICWP web-page. The WD or PC user can enter, into the PICWP web-page, data defining the device with which it wishes to communicate. This data could be a voice over internet protocol (VoIP) user name of a specific internet service provider (ISP). This is especially useful for a WD, since it is otherwise very difficult for a WD (particularly a low-end mobile telephone) to call a VoIP user.

The PIC will then process the WD or PC user request and connect to the device hosting the user account of the calling party—e.g. an ISP. The PIC will then log-into the corresponding user account associated with such PIC inbound (i.e. calling party) user, or in this case WD or PC user. The PIC will then set the ISP calling party user account to route (e.g. call forward or call divert) to the PIC inbound user specified VoIP user name—i.e. the VoIP user name of the called party. Hence, any call made by the calling party to the ISP will automatically forward to the required calling party. Then the PIC will reply to the inbound, calling party user with a different web page, informing the inbound, calling party user that the call forward request has been processed. The PIC then allows the inbound, calling party user to initiate his call to the called party VoIP user name from any device it wishes, be it from a PC or VoIPD over the internet, from any phone, (meaning any FD or WD) by calling the dynamically assigned call-in phone number associated with the specific ISP calling party user account. All calls to this phone number are automatically forwarded to the specified called party VoIP user name. Once the specific inbound, calling party user initiates the call to the dynamically assigned call-in phone number associated with the specific ISP called party user account, the inbound, calling party user will be connected through to the specified called party VoIP user.

As the PIC is accessible world-wide through the PICWP using the internet, any authorised in-bound user, i.e. any WD with internet access, will be capable of calling any VoIP user name world-wide, from any country where the ISP calling party user account has at least one call-in phone number, at the applicable call-in tariffs.

DRAWINGS 1 to 8, show some of the preferred embodiments of the proprietary internet converter (PIC), proprietary internet converter web pages (PICWP) and/or proprietary voice over internet protocol call forwarding (PVoIPCF) as described in this invention.

Specifically, DRAWINGS 1 to 4 are block diagrams of communications systems, showing the preferred embodiments of the present invention. There is shown voice over internet protocol users (VoIP User 1 and VoIP User n), each associated with a specific voice over internet protocol user account of an internet service provider. Some of these users can be calling parties, others may be the called party. An internet device (ID) is also shown. It has at least one or more built-in proprietary internet converters (PIC). Each such PIC has at least one or more built-in proprietary internet converter web pages (PICWP). Internet service providers (ISP to ISPn) are shown—the ISP has the capability of call forwarding incoming calls of all its VoIP users to any such other of its VoIP users. Any individual VoIP user of an ISP has at least one or more dedicated call-in numbers assigned or dedicated to an individual user account. Each individual ISP user account, authorized to make use of the PIC functions, is accessible by the PIC. Any individual user account holder may access the PIC functions from any device capable of accessing the internet, at any available bit-rate (even at very low bit-rates), strictly for setting its own ISP VoIP user account parameters settings, in particular the call routing/forwarding to another VoIP user.

Drawing 1 in particular shows an architecture of the PIC, and its built-in PICWP. The PIC is within or build-into an internet device (ID), which at its most simple form may be an internet server; the related ISP is capable of call forwarding to at least all its ISP users (voice over internet protocol users or names). Drawing 2 shows an architecture where the ISP is not capable of call forwarding incoming calls to its ISP users on its own and therefore requires an additional built-in "proprietary voice over internet protocol call forwarding" (PVoIPCF) module or system.

Drawing 3 shows an architecture of the PIC, and its built-in PICWP, within or built-into an internet service provider (ISP) device, which in its most simple form may be an internet server. The ISP is capable of call forwarding to at least all its ISP users (voice over internet protocol users or names). Drawing 4 shows in particular an architecture where the ISP is not capable of call forwarding incoming calls to its ISP users on its own and thus has a built-in "proprietary voice over internet protocol call forwarding" (PVoIPCF) module or system.

DRAWINGS 5 to 8 are to be understood as depicting any devices and/or networks and/or interfaces, be it a voice over internet protocol device (VoIPD) and/or fixed device (FD) and/or desktop or portable computer (PC) and/or wireless device (WD), and/or wireless network (WN), and/or public access network (PAN), internet device (ID) and/or internet service provider (ISP), and/or wireless private and/or public interface (IF_W), and/or fixed wired and/or wireless private and/or public interface (IF-P), including VoIPD to VoIPn, FD to FDn, PC to PCn, WD to WDn, WN to WNn, PAN to PANn, ID to IDn, ISPD to ISPDn, IF_W1 to IF_Wn and IF_P1 to IF_Pn.

IF_W1 is a wireless interface between any WD and his corresponding WN, IF_P2 is a fixed and/or wireless interface between any such ISP and the corresponding WN, IF_P3 is a fixed and/or wireless interface between any such WN and the corresponding PAN, IF_P4 is a fixed and/or wireless interface between any such internet device (FD) and the corresponding PAN, IF_P5 is a fixed and/or wireless interface between any such PC and the corresponding PAN, IF_P6 is a fixed interface between any such fixed device (FD) and the corresponding PAN, IF_P7 is a fixed and/or wireless interface between any such voice over internet protocol device (VoIPD) and the corresponding PAN. The PIC is capable of communicating with internet service providers (ISP and ISPn), the ISP with a built-in PVoIPCF and the ISPn without, as the ISPn is capable of call forwarding to all its VoIP users.

The PIC, with an embedded PICWP, is built-into an ID, as shown in Drawing 5 and/or built-into a ISP, as shown in Drawing 6 and/or built-into a PC, as shown in Drawing 7 and/or built-into a VoIPD, as shown in Drawing 8.

DRAWINGS 9 and 10 are to be understood as depicting any devices and/or networks and/or interfaces as shown in DRAWINGS 5, 6, 7 and 8 and, additionally, an international public access network (IPAN) and public international interfaces (IF_PI), linking any such previously mentioned devices and/or networks and/or interfaces cross border or cross region or cross country. Within the scope of these drawings is any single or multiple combinations of the devices etc. shown in DRAWING 5 and/or DRAWING 6 and/or DRAWING 7 and/or DRAWING 8 within each region or country and/or any single or multiple of the combinations of international public access network (IPAN to IPANn) and/or any single or multiple of the combinations of international interfaces (IF_PI1 to IF_PIn). DRAWINGS 9 and 10 show some of the preferred implementations of the invention at a macro level, by combining the architectures and interconnections of the embodiments of the present invention as shown previously in Drawings 5 to 8.

DRAWINGS 11, 12 and 13, show some of the preferred implementations of the PIC, PICWP and PVoIPCF respectively, of this invention, at flow chart level.

One of the preferred embodiments of the present invention and its advantages are best understood by referring to DRAWING 5. Essentially, a proprietary internet converter (PIC) method and architecture, specifically for call routing, or call forwarding or call diversion, towards voice over internet protocol users, is shown.

It is applicable to users of any device(s) that can access the internet and which have an associated internet device and/or internet service provider user account with at least one or more account specific call-in number and call forwarding or call divert functions to all of its corresponding internet service provider users. Such call forwarding or call divert function may be performed by an internet device and/or internet service provider for each of their individual accounts or by a proprietary voice over internet protocol call forwarding embedded into such internet device and/or internet service provider capable of enabling, setting and disabling each of their individual accounts call forwarding or call diversion. Any voice over internet protocol device (VOIPD), fixed device (FD), desktop or portable computer (PC) or wireless device (WD), meaning any device capable of accessing the internet in any possible way, will be able to interconnect and communicate with and access the user interface of the proprietary internet converter (PIC), meaning the internet or web pages of the proprietary internet converter web pages (PICWP) embedded into the PIC or separated from the PIC.

The PICWP is capable of interconnecting and communicating with the corresponding PIC; the PIC is capable of interconnecting and communicating with the corresponding "internet device" (ID) and "internet service provider" (ISP or ISPn). The ISP or ISPn is any device with which the corresponding previously mentioned VoIP-, FD-, PC- or WD-user has a user account, and that is capable of accessing the internet in any possible way. The PIC is able to interconnect and communicate with and access the corresponding user account parameters, and specifically can set the "voice over internet protocol user" (VoIP user) incoming call forwarding function to any of its "VoIP users" provided by such ID, ISP or ISP. Alternatively, call forwarding can be provided through an embedded "proprietary voice over internet protocol call forwarding" (PVoIPCF) module within a corresponding ID and/or ISP and/or ISPn.

To illustrate the benefits of the present invention, referring to DRAWING 5, let us make the following assumption or considerations:

the ISP has no capability for an incoming call forwarding function to other of its "VoIP users", and therefore it requires an embedded PVoIPCF. The ISPn has such an incoming call forwarding function to other of its "VoIP users".

an individual user is authorised to use the functions of the PIC as "USER 1"; USER 1 has a subscription with a wireless network (WN), and is the user of a WD capable of accessing the internet (WD USER 1) and also has a user account with an internet service provider ISPn (ISPn USER 1) with a user assigned account login and password, and with a dynamically assigned call-in phone number (CALL IN 1), with such call-in phone number, being a PSTN or SIP call-in line, dynamically assigned to such user account user (ISPn USER 1).

another different individual user is authorised to use the functions of the PIC as "USER 9"; USER 9 has a subscription with a fixed network (PAN), and is the user of a FD, meaning a landline phone (PSTN, POTS, SIP) and a PC capable of accessing the internet (PC USER 9) and USER 9 also has a user account with an internet service provider ISP (ISP USER 9) with a user assigned account login and password, and with dynamically assigned landline call-in phone number (CALL IN 9) to such user account user (ISP USER 9).

"PC USER 9" will connect to the internet, by any means available, with a connection protocol or interfaces such as PSTN, POTS, ISDN, SIP, E&M, V.5, V.11, V.35, ATM, X21, X25, DSL, XDSL, ADSL, ADSL2, ADSL2plus, SHDSL, VoIP-Gateway interface, 802.11, WiFi, WiMax, or any such other current or future interfaces or any such other PC means of connecting to and communicating through the internet. Basically, it will connect to the "internet protocol address" (IP address) or "Uniform Resource Locator" (URL) of the PICWP and/or PIC, for example (i.e.) "internet web page 1" as shown in DRAWING 12. The interface protocol of the PIC, with a built-in PICWP, can be (but is not limited to) chtml, htmb basic, x html, wml, WAP 2.0 or any such other variants thereof or different interface protocols. Consequently PC USER 9 will enter a specific "VoIP user" name of ISP, say i.e. "ISPn USER 999"; the VoIP user of the ISP can be formed of any length of characters and as a combination of any characters, be they letters and/or numbers and/or symbols such as for example "myname99_new". The PC USER 9 will then hit the send icon. The PIC will log-into "ISP USER 9" and set the incoming call forward function to "ISP USER 999" and optionally set the account status to "OFF LINE" and then log-out of the user account and then reply to "PC USER 9" with i.e. "internet web page 2", as shown in DRAWING 12. The "PC USER 9" now knows that his call forwarding is set in this specific example to "ISP USER 999". "PC USER 9" can call from anywhere in the world using any device capable of making phone calls to the phone number "CALL IN 9" and then the "USER 9" will connect and communicate with "ISP USER 999".

In a different example, but still applying the previous assumptions, "WD USER 1" will connect to the internet, by any means available, for example using as a connection protocol Doma, Fomu, TDMA, WTDMA, GPRS, UMTS, CSD, EDGE, WIFi, WiMax or any such other WD means of connecting to and communicating through the internet. Basically, it will connect to the "internet protocol address" (IP address) or "Uniform Resource Locator" (URL) of the PICWP and/or PIC, in example (i.e.) "internet web page 1" as shown in DRAWING 12. The interface protocol of the PIC, with a built-in PICWP, can be but is not limited to chtml, htmb basic, x html, wml, WAP 2.0 or any such other variants thereof or different interface protocols. Consequently "WD USER 1" will enter a specific "VoIP user" name of ISPn, say i.e. "ISPn USER 999". The VoIP user of ISPn can be formed of any length of characters and as a combination of any characters, be they letters and/or numbers and/or symbols such as for example "myname99_new". Then the WD USER 1 will hit the send icon. The PIC will log-into "ISPn USER 1" and set the incoming call forward function to "ISPn USER 999" and optionally set the account status to "OFF LINE" and then log-out of such user account. The user will then reply to "WD USER 1" with i.e. "internet web page 2", as shown in DRAWING 12. The "WD USER 1" simply has to click on the icon referred to in DRAWING 12 as "Click call to VoIP user" or in this specific example "Click call to ISPn USER 999", and then the WD of "WD USER 1" will recognise automatically the so called "Call to" function or command from the PIC. The WD of "WD USER 1" will initiate an outgoing call to "CALL IN 1". In some WDs, the WD may request "WD USER 1" for an acknowledgement to initiate the call automatically to "CALL IN 1", and then the "WD USER 1" will connect and communicate with "ISPn USER 999". If such "CALL IN 1" is i.e. a SIP call-in phone line and "WD USER 1" and "ISPn USER 999" have a voice/video capability, then the previously mentioned call, which was call forwarded or call diverted by the PIC and PICWB to "USER ISPn999", could be a voice/video call.

SUMMARY OF KEY FEATURES

An implementation of the present invention involves a communications system including a proprietary internet converter (PIC), with built-in proprietary internet converter web pages (PICRWP). The PIC is capable of communicating, through the internet, with internet devices (ID), service providers (ISP, ISPn) fixed devices (FD), desktop or portable computers (PC), wireless devices (WD), and voice over internet protocol devices (VoIPD). This implementation enables any device capable of communicating through the internet to interface with (and/or interconnect) and communicating with one or more PICs.

Each PIC may be resident in or built-into a device that is different from the device it communicates with, so long as the device it is resident in is capable of communication through the internet. Example devices that the PIC may be resident in include a fixed device (FD), a desktop or portable computer (PC), a voice over internet protocol device (VoIPD) or indeed any other device capable of communicating through (or being connected to) an internet service provider (ISP) or an internet device (ID) or a public access network (PAN) or a wireless network (WN). These devices should preferably have a dedicated user specific call forwarding function. This could be an internal call forwarding function. Alternatively, (especially if no internal call forwarding function is present) they can be supplemented with a built-in proprietary VoIP call forwarding (PVoIPCF) module or system. One or more call-in phone number(s) are dynamically assigned to each specific user as and when needed: this is a user-specific number that the calling party can dial in order to connect with the PIC. It will usually incur a local call charge, or may be free.

The implementation also enables interfacing and/or interconnecting and communicating one or more PICs, through the internet, with yet another PIC or with any voice over internet protocol (VoIP) user account(s) resident in a fixed device (FD), desktop or portable computer (PC), voice over internet protocol device (VoIPD) or indeed any such other device capable of accessing the internet and communicating through or connected to an internet service provider (ISP), an internet device (ID) a public access network (PAN) or a wireless network (WN). Each PIC is capable of setting the call forward function of each specific and corresponding VoIP user account. Each such PIC is capable of (i) communicating a confirmation of such call forwarding, specifically VoIP user name call forwarding, to the calling party that requested such call forwarding and (ii) returning a "call to" command, linked to the calling party specific, dynamically assigned call-in phone number (i.e. the number that the calling party dials in to. This call is then routed/forwarded to the appropriate called party).

Interfacing and/or interconnecting and communicating one or more PC, FD, WD, VoIPD (or any such other device capable of communicating through or connected to a ISP or ISPn or a ID), with one or more PICs, is possible through a public interface IF_P through a PAN. It is also possible through (i) another public interface (i.e. different to the previously mentioned IF_P) or (ii) through a wireless interface IF_W through a WN and through a public interface IF_P and (iii) through a PAN and through yet another IF_P.

Recap on Terminology

PC to PCn are desktop and/or portable personal computer devices in any available current and future analogue and/or digital technologies respectively, capable of connecting and communicating through the internet.

VoIPD to VoIPDn are fixed and/or wireless voice over internet protocol devices in any available current and future analogue and/or digital technologies respectively, capable of connecting with and communicating through the internet.

FD to FDn are fixed devices in any available current and future analogue and/or digital technologies respectively, capable of making and receiving calls.

WD to WDn are wireless devices and/or mobile phones and/or wireless battery powered handheld devices in any available current and future analogue and/or digital technologies respectively, capable of connecting with and communicating through the internet and capable of making and receiving calls.

ID to IDn are fixed internet devices and/or server devices in any available current and future analogue and/or digital technologies respectively, capable of connecting with and communicating through the internet.

ISP to ISPn are service provider devices and/or computing devices and/or server devices in any available current and future analogue and/or digital technologies respectively, capable of connecting with and communicating through the internet and capable of connecting with and communicating to a public access network and/or a wireless network.

WN to WNn are wireless networks in any available current and future analogue and/or digital technologies respectively.

PAN to PANn are public access networks and/or switching networks in any available current and future analogue and/or digital technologies respectively.

IF_W, IF_W1 to IF_Wn ate wireless interfaces in any available current and future analogue and/or digital technologies respectively.

IF_P1 to IF_Pn and IF_PC1 to IF_PCn are wired and/or wireless interfaces in any available current and future analogue and/or digital technologies respectively.

Other Main Implementation Features

Any individual or multiple PIC, has at least one built-in PICWP. Any PIC may be located in the same geographical location (country 1) or in a different geographical location (country 2 to county n) than the devices with which it will interconnect and/or communicate with.

Any PIC is capable of interfacing, communicating and processing multiple simultaneous in and/or outbound communications with any calling party device capable of accessing the internet. These devices include, but are not limited to, any individual or multiple PC, FD, WD and VoIPD. Each such individual PC, FD, WD and VoIPD is user authorized to use the PIC functions and also has an individual user account with an ID or ISP or ISPn. The authorized, individual PC, FD, WD and VoIPD users are collectively referred to as "PIC users". At first, when a "PIC user" connects to the PIC, it will effectively interact with the PIC through the PICWP. Each such individual or multiple PIC is capable of interfacing, communicating and processing multiple simultaneous in and/or outbound communications with (i) any individual or multiple "PIC users" and (ii) any individual or multiple ID and/or ISP and/or ISPn and any such other ID and/or ISP and/or ISPn.

Any individual or multiple ID, can have a built-in PIC; and such ID can have at least one or more internet interfaces IF_P and each such individual or multiple ID is capable of processing multiple simultaneous in and/or outbound communications with individual or multiple PIC users and individual or multiple ISP or ISPn.

Any individual or multiple ISP or ISPn is capable of call forwarding incoming calls to a dynamically assigned calling party account user; such incoming calls can be originated from a call-in phone line dynamically assigned to each such account user or from other ISP users. The ISP or ISPn has multiple internet interfaces IF_P, IF_Pn, capable of processing multiple simultaneous in and outbound communications.

Any individual or multiple ISP or ISPn is capable of call forwarding incoming calls to a specific account user, where such incoming calls are originated from a call-in phone line(s) dedicated to each such account user only. Such incoming calls are originated from an ISP user and the ISP or ISPn has multiple internet interfaces IF_P, IF_Pn, capable of processing multiple simultaneous in and outbound communications.

The PVoIPCF is capable of processing and setting any such call forwarding or call divert, received from any PIC, set by any such PIC authorised user; the call forward or call divert request can be of any length of characters and combination of any characters, be they letters and/or numbers and/or symbols and/or any combination of the previous.

Any individual or multiple proprietary internet converter (PIC) is capable of interfacing and communicating concurrently or simultaneously with any individual or multiple PIC user. It is also capable of communicating concurrently or simultaneously with any individual or multiple individual user account with an ISP or ISPn. At first, when the PIC receives a call forward, also known as call divert request, say from "PIC user1", more specifically a call forward request to a "VoIP userX" of "ISP1", then the PIC will connect to "ISP1" and log-into the PIC user1 corresponding user account. Say this corresponding user account has an associated "VoIP user1" name and an associated, dynamically assigned call-in number, for example "00123456789". The PIC will set the incoming call forwarding to "VoIP userX" and then reply back to the "PIC user1" with a confirmation of the call forwarding setting with a "call to" command or link through the PICWP. "PIC user1" can decide which method it chooses to make use of for the call forwarding function.

After this previous confirmation receipt by the "PIC user1", the following options are possible:

in the event the "PIC user1" is a PC or VoIPD user, it can opt to call his own "VoIP user1" through "ISP1". Or he can dial with any phone in the world, including any fixed phone (FD) or any mobile or wireless phone (WD) or any internet service provider call out. He therefore calls the "VoIP user1" dynamically assigned associated call-in number "00123456789" in order to call "VoIP userX".

in the event the "PIC user1" is a wireless device (WD) user, it can opt, upon receipt of the call forwarding confirmation, to acknowledge the "call to" command or link. The WD will then initiate automatically, (or in some WDs, only after an additional WD acknowledgement request required by the WD user or "PIC user1") a call to "VoIP user1" associated call-in number "00123456789" in order to call "VoIP userX". The PIC, and the PICWP, are capable of processing any such call forwarding or call divert, from any PIC authorised user request, with such call forward or call divert request being of any length of characters and any combination of any characters, be they letters and/or numbers and/or symbols and/or any combination of the previous.

Any individual or multiple ISP user account, for example (i.e.) "ISP user1", has at least one call-in phone number for different geographies or countries, thus allowing each corresponding "PIC user" (i.e. PIC user1) to call any "VoIP user" of each of the corresponding ISPs from those different geographies or countries. Doing so will cost the same as or less then the cost of the local call rate that would be charged to a device directly calling the corresponding country call-in number.

Any individual or multiple ISP user account, for example "ISP user1", has at least one call out phone service capable of calling any phone number of any region, geographies or countries. This allows each corresponding "PIC user" (i.e. PIC user1) to call any phone number using call forwarding of the corresponding ISP user1 account for that PIC user1, through the PIC and then through the corresponding ISP.

Any individual or multiple PIC, or parts of it, is capable of communicating through the internet with yet another PIC, or parts of it. The latter PIC, or parts of it, is different to the former PIC. But any PIC, or parts thereof, may be located in any ID, ISP, ISPn, VoIPD or PC based in any location in the world.

Any individual or multiple ISP or ISPn user account, or parts of it, may have a built-in proprietary voice over internet protocol call forwarding (PVoIPCF).

Some functions of any individual or multiple PIC, may be built-into any ID, ISP, ISPn, VoIPD or PC, whilst the remaining functions are built-into any other ID, ISP, ISPn, VoIPD or PC. The latter ID, ISP, ISPn, VoIPD or PC may be located in the same region or country as the former, or may be in a different region or country. Any such parts of any individual or multiple PIC is capable of connecting and communicating with the corresponding remaining parts of each corresponding PIC.

Parts of any individual or multiple PIC can be built-into an ID; such ID has at least one or more internet interfaces IF_P and each such individual or multiple ID is capable of processing multiple simultaneous in and/or outbound communications with individual or multiple PIC users and individual or multiple ISP or ISPn.

Many modifications and variations of this present invention are possible in view of the above disclosures, drawings and explanations. Thus, it is to be understood that, within the scope of the appended claims, the invention can be practiced other than as specifically described above. The invention which is intended to be protected should not, however, be construed as limited to the particular forms disclosed, or implementation examples outlined, as these are to be regarded as illustrative rather than restrictive. Variations could be made by those skilled in the art without deviating from the spirit of the invention. Accordingly, the foregoing detailed disclosures, descriptions and drawings should be considered exemplary in nature and not limited to the scope and spirit of the invention as set forth in the claims herein.

APPENDIX 1

This appendix describes a further implementation of the present invention. The general principles are similar to the implementation described in the main Detailed Description, but the terminology differs. In particular:

The proprietary internet converter PIC corresponds to the proprietary dynamic line assignment" (PDLA).

The proprietary internet converter web pages (PICWP) corresponds to the proprietary dynamic line assignment web pages" (PDLAWP).

DRAWINGS 14 and 17 show one example of an implementation of the "proprietary dynamic line assignment" (PDLA) and "proprietary dynamic line assignment web pages" (PDLAWP). The PDLAWP may be a sub part of or embedded into a PDLA as per Drawing 14, or accessible remotely as per Drawing 15. So the proprietary dynamic line assignment (PDLA) can be build-into an internet device (ID) or a switching centre (SWITCH), respectively communicating through a PDLA/PDLAWP interface and/or ID interface and/or SWITCH interface (and also through the public access network (PAN)).

Drawing 14 in particular shows a method and architecture of the PDLA, and its built-in PDLAWP, within or built-into an internet device (ID). The ID in its most simple form may be an internet server; the switching centre (SWITCH) in its most simple form is capable of call forwarding or call divert any of its call-in telephone lines to any other "fixed and mobile telephone number" world-wide. DRAWING 15 shows a method and architecture where the PDLA is embedded inside or collocated with the SWITCH, whist the PDLAWP is embedded inside an internet device (ID). The PDLAWP is the internet interface for any call request (call forward or call divert) from any fixed and/or wireless device (WD).

DRAWINGS 16, 17 and 18 are implementations in accordance with the present invention with respect to some of the different switching centres (SWITCH), internet devices (ID), internet service providers (ISP), wireless networks (WN) and public access networks (PAN) architectures. Within the scope of these implementations are any devices capable of accessing the internet and/or capable of making calls, such as desktop or portable computers (PC) and/or fixed devices (FD) associated with the PAN and/or SWITCH and/or ISP, voice over internet protocol devices (VoIPD) associated with such PAN and/or ID and/or ISP, and wireless devices (WD) associated with such WN.

IF_W1 is a wireless interface between any WD and his corresponding WN, IF_P2 is a fixed and/or wireless interface between any such WN and the corresponding PAN, IF_P3 is a fixed and/or wireless interface between any such PC and the corresponding PAN, IF_P4 is a fixed and/or wireless interface between any such FD and the corresponding PAN, IF_P5 is a fixed and/or wireless interface between any such VoIPD and the corresponding PAN, IF_P6 is a fixed and/or wireless interface between any such SWITCH and the corresponding PAN, IF_P7 is a fixed and/or wireless interface between any such ISP and the corresponding PAN, IF_P8 is a fixed and/or wireless interface between any such ID and the corresponding PAN. The PDLA is capable of connecting and communicating with any authorised FD, WD, PC, ID, ISP, SWITCH and the SWITCH and/or ISP is capable of call forwarding or call diverting its call-in telephone numbers to any other telephone numbers and/or any other VoIP ISP user name respectively.

The PDLA, with an embedded or remotely accessible PDLAWP, may be build-into an ID, as shown in Drawing 16 and/or build-into an ISP, as shown in Drawing 17 and/or build-into a SWITCH, as shown in Drawing 18 and/or regardless of the drawings herein the PDLA, with an embedded or remotely accessible PDLAWP, may be build-into a VoIPD or PC.

DRAWINGS 19 and 20 show two implementations in accordance with the present invention with respect to the "proprietary dynamic line assignment" (PDLA), with a built-in or remotely accessible "proprietary dynamic line assignment web pages" (PDLAWP), in a multi country or region architecture or implementation. The PDLA and/or PDLAWP may consist of any single or multiple combination of the elements shown, or an equivalent of each such function or addition performing a similar function within the overall method of this invention, without limiting any such other ways of implementing the PDLA and/or PDLAWP and its overall architectures and methods as described within the claims of this invention.

DRAWINGS 21, 22 and 23 show implementations in accordance with the present invention with respect to the "proprietary dynamic line assignment" (PDLA) flowchart as shown in Drawing 21. The "proprietary dynamic line assignment web pages" (PDLAWP) are expanded as shown in Drawing 22, and one of the possible variants of an is shown in Drawing 23.

An implementation, integration or flowchart of the PDLA and/or PDLAWP may consist of (i) all of the shown sub-modules and/or sub-routines and/or sub-flowcharts and/or implementation examples, or (ii) any single or multiple combinations or additions thereof or (iii) an equivalent of each such sub-modules and/or sub-routines and/or sub-flowcharts and/or implementation examples or addition performing a similar function.

DRAWINGS 24 and 25 are some implementations in accordance with the present invention with respect to some of the different architectures, comprising specifically;

a PDLA and PDLAWP embedded in an internet device (ID) or (PDLA/PDLAWP Server) and an associated local fixed operator switching centre (Local Operator SWITCH), in particular as shown in Drawing 24;

and a PDLA and PDLAWP embedded in an internet device (ID) or (PDLA/PDLAWP Server) and an associated local fixed operator switching centres (Local Operator SWITCH) and users associated internet service provider server (ISP server), in particular as shown in Drawing 25;

Any implementation, integration or architecture which includes the PDLA and/or PDLAWP may consist of (i) all of the shown diagrams and/or implementation examples or any single or multiple combination or addition thereof or (ii) an equivalent of each such diagrams and/or implementation examples or addition performing a similar function within the overall method of this invention.

Turning to the Drawings 14-25 in more detail, one of the preferred embodiments of the present invention and its advantages are best understood by referring to DRAWING 24.

Essentially, the embodiment provides a "proprietary dynamic line assignment" method and architecture(s) specifically for call routing (or call forwarding or call divert) to any fixed or mobile telephone number or VoIP user name. It is applicable to users of any device(s) that can access the internet and which have an associated "proprietary dynamic line assignment" (PDLA) and/or "switching centre" (SWITCH) with dynamically assignable call-in telephone number(s).

In another related system, outside of the scope of this invention but described in a related patent specification, the call-in numbers are not dynamically assignable, but instead there are one or more PDLA user account specific call-in telephone number and call forwarding or call divert function to any fixed or mobile telephone number or VoIP user name. For simplicity, both systems will be described.

The call forwarding or call divert function may be performed by a PDLA and "proprietary dynamic line assignment web pages" (PDLAWP) and a SWITCH, for each of the SWITCH individual call-in telephone numbers and/or accounts. The implementation provides a method for interfacing and/or interconnecting and communicating such "proprietary dynamic line assignment" (PDLA) with a built-in "proprietary dynamic line assignment web pages" (PDLAWP) with any desktop or portable computer, voice over internet protocol device and "wireless device" (WD), capable of interconnecting and communicating through or with the internet and through a "proprietary dynamic line assignment" with a built-in or remotely connected "proprietary dynamic line assignment web pages" with any one or more SWITCH.

As a way of illustrating the benefits of the present invention, referring to DRAWING 24, let us make the following assumptions or considerations:

(i) SWITCH provides an incoming call forwarding or call divert function to any fixed and mobile telephone number in the world, and SWITCH is capable of communicating with the "proprietary dynamic line assignment" (PDLA) at least the caller identification number of incoming calling parties and the time in call per SWITCH call diverted connection.

(ii) PDLA has the capability of interacting with a built-in or remotely accessible PDLAWP, and PDLA is capable of communicating with the SWITCH at least the caller identification number to whom the SWITCH has to call divert or call forward one of each specific SWITCH call-in telephone line number.

(iii) an individual user is authorised to use the functions of the PDLA as "USER 1"; USER 1 has a subscription with a wireless network (WN), and is the user of a WD capable of accessing the internet (WD USER 1).

Considering the previous assumptions, (i), (ii) and (iii), for this next example, then at first the "WD USER 1" will connect to the internet, by any means available, (e.g. Doma, Fomu, TDMA, WTDMA, GPRS, UMTS, CSD, EDGE, WIFi, WiMax or any such other WD means of connecting to and communicating through the internet). It basically will connect to the "internet protocol address" (IP address), also referred to as the "Uniform Resource Locator" (URL) of the PDLAWP and/or PDLA, for example "internet web page 1" as shown in DRAWING 22. The interface protocol of the PDLA, with a built-in PDLAWP, may be but is not limited to chtml, htmb basic, x html, wml, WAP 2.0 or any such other variants thereof or different interface protocols.

Consequently "WD USER 1" will enter a specific "telephone number", say i.e. "0012345678", whereas such telephone number can be formed of any length of characters and as a combination of any characters, be they letters and/or numbers and/or symbols as can be seen in Drawing 23, and then the WD USER 1 will hit the send icon.

Then the PDLA will communicate with the SWITCH and set the corresponding SWITCH call-in telephone number (say i.e. "CALL IN 1") call forward or call divert function to "0012345678" and then reply to "WD USER 1" with i.e. "internet web page 2", as shown in DRAWING 21. The "WD USER 1" simply has to click on the icon referred to in DRAWING 21 as "Click call to phone number" or in this specific example "Click call to 0012345678", and then the WD of "WD USER 1" will recognise automatically the so called "Call to" function or command from the PDLA/PDLAWP.

Then the WD of "WD USER 1" will initiate an outgoing call to "CALL IN 1". In some WDs, the WD may request the "WD USER 1" for an acknowledgement to initiate the call automatically to "CALL IN 1", and then the "WD USER 1" will connect and communicate with "0012345678". If such "CALL IN 1" is for example a SIP call-in telephone line and "WD USER 1" and ""0012345678"" have a voice/video capability then the previous mentioned call, which was call forwarded (sometimes also referred to as call diverted) by the PDLA/PDLAWP/SWITCH to "0012345678", could be a voice/video call.

Another of the preferred embodiments of the present invention and its advantages are best understood by referring to DRAWING 25. It is in essence the same as above, but the "proprietary dynamic line assignment" method and architecture(s) specifically for call routing, or calls forwarding or calls divert, is now towards any "voice over internet protocol user name or user account" (VoIP User). It is again applicable to users of any device(s) that can access the internet which have an associated "proprietary dynamic line assignment" (PDLA) and/or "switching center" (SWITCH) and/or "internet service provider" (ISP" with dynamically assignable call-in telephone number(s).

As above, an alternative scenario in which the call-in numbers are not dynamically assignable but instead there at least one "PDLA user account" or "ISP user account" specific call-in telephone number and call forwarding or call divert function to any "fixed or mobile telephone number".

The call forwarding or call divert function may be performed by a PDLA and "proprietary dynamic line assignment web pages" (PDLAWP) and a SWITCH or ISP, for each of the SWITCH or ISP individual call-in telephone numbers and/or accounts. The implementation enables any desktop or portable computer, voice over internet protocol device and "wireless device" (WD), (and that is capable of interconnecting and communicating through or with the internet and through a "proprietary dynamic line assignment" with a built-in or remotely connected "proprietary dynamic line assignment web pages"), to interface and/or interconnect and communicating with any one or more SWITCH or ISP.

As a way of illustrating the benefits of the present invention, referring to DRAWING 25, let us make the following assumptions or considerations:

(i) ISP can provide an incoming call forwarding or call divert function to any of its "voice over internet protocol user name or user account" (VoIP User) in the world, and ISP is capable of communicating with the "proprietary dynamic line assignment" (PDLA) at least the call-in telephone number(s) associated to the corresponding "VoIP User account".

(ii) PDLA has the capability of interacting with a built-in or remotely accessible PDLAWP, and PDLA is capable of communicating with the ISP at least the "VoIP User" to whom the ISP has to call divert or call forward one of each ISP specific "VoIP User account" associated with the specific call-in telephone line number.

(iii) an individual user is authorised to use the functions of the PDLA as "USER 2". "USER 2" has a subscription with a wireless network (WN), and is the user of a WD capable of accessing the internet (WD USER 2).

Considering the previous assumptions, (i), (ii) and (iii), for this next example, then at first "WD USER 2" will connect to the internet, by any means available (e.g. Doma, Fomu, TDMA, WTDMA, GPRS, UMTS, CSD, EDGE, WIFi, WiMax or any such other WD means of connecting to and communicating through the internet). Basically, it will connect to the "internet protocol address" (IP address), also referred to as a "Uniform Resource Locator" (URL), of the PDLAWP and/or PDLA, e.g. "internet web page 1" as shown in DRAWING 9. The interface protocol of the PDLA, with a built-in PDLAWP, may be (but is not limited to) chtml, htmb basic, x html, wml, WAP 2.0 or any such other variants thereof or different interface protocols.

Consequently "WD USER 2" will enter a specific "VoIP user" name of ISP, say "ISP USER AB9". VoIP user of ISP can be formed of any length of characters and as a combination of any characters, be they letters and/or numbers and/or symbols as per Drawing 23. The "WD USER 2" will hit the send icon. Then the PDLA/PDLAWP will log-into "WD User 2 ISP account" and set the incoming call forward function to "ISP USER AB9" and optionally set the "WD User 2 ISP account" status to "OFF LINE" and then log-out of the "WD User 2 ISP account" and then reply to "WD USER 2" with i.e. "internet web page 2", as shown in DRAWING 22. The "WD USER 2" now simply has to click on the icon, referred to in DRAWING 22 as "Click call to phone number". In this specific example it would show "Click call to "ISP USER AB9"", and then the WD of "WD USER 2" will recognise automatically the so called "Call to" function or command from the PDLA/PDLAWP. The WD of "WD USER 2" will then initiate an outgoing call to "WD User 2 ISP account Call-in Telephone number". In some WD, the WD may request the "WD USER 2" for an acknowledgement to initiate the call automatically to "WD User 2 ISP account Call-in Telephone number". Then, the "WD USER 2" will connect and communicate with "ISP USER AB9". If however such "WD User 2 ISP account Call-in Telephone number" is for example a SIP call-in telephone line and "WD USER 2" and "ISP USER AB9" have a voice/video capability, then the previous mentioned call, which was call forwarded (sometimes also referred to as call diverted) by the PDLA/PDLAWP/ISP to "ISP USER AB9", could be a voice/video call.

The invention claimed is:

1. A system that enables a calling party to communicate with a called party over a communications network, the system comprising:
   (a) a dynamic line assignment module that can dynamically assign to the calling party a free and unused call-in number that is not permanently associated with either the calling party or the called party, by automatically selecting that call-in number from a large group of possible call-in numbers;
   (b) a web page storage device that is operable to send, over the internet, (i) web pages to a calling party device, the web pages including a data entry screen into which a user enters a required VoIP user name with which communication is sought and (ii) the free and unused call-in number assigned by the dynamic line assignment module;
   (c) a conversion device that is operable to receive over the internet, from the calling party device, the VoIP user name and can cause the altering of call forwarding settings at a switch, such that a call from the calling party device to the call-in number assigned by the dynamic line assignment module will be automatically forwarded to a device associated with the VoIP user name of the called party; and in which the conversion device:
   (a) extracts VoIP user name sent by the calling party device and converts the associated command into a language the switch understands;
   (b) sets-up a call forwarding of a dynamically assigned call-in phone number of the switch to such specific VoIP user name associated with a specific ISP user account;
   (c) then converts the dynamically assigned call-in phone number, which has been call forwarded to VoIP user name, into a command to dial that call-in phone number, in a form that the calling party device web browser understands;
   (d) sends that command to dial that call-in phone number to the calling party device in the form of a specific web page with that command embedded in it, so that the calling party only has to click on a web page link to cause the calling party device to automatically dial the call-in phone number, which is embedded in the command associated with the web page link.

2. The system of claim 1 in which the conversion device (i) converts an instruction from the calling party device to dial a specific telephone number or VoIP user name to instructions that the switch can understand and act upon in order to set up call forwarding and (ii) dynamically assigns and sets up a call-in number for the calling party device to dial.

3. The system of claim 1 in which the calling party does not have a fixed, permanently assigned call-in number, but instead, the call-in number is temporarily assigned each time a calling-party makes a call.

4. The system of claim 1 in which the dynamic line assignment module can access the status of all call-in numbers and determine which are free and hence available for use.

5. The system of claim 1 in which call-in numbers are stored in a FIFO (first-in-first-out) to facilitate retrieval of free numbers.

6. The system of claim 1 in which after a fixed or programmable time period, the call forward function is removed from a call-in number so that it becomes free for re-use by the next calling party.

7. The system of claim 1 in which the calling party device communicates over the internet with the conversion device that (i) receives the VoIP user name and (ii) sends instructions to the switch to alter the call forwarding settings.

8. The system of claim 1 in which the conversion device can convert the protocols and instructions sent from the calling party device to a form that the switch can correctly use.

9. The system of claim 1 in which the web pages of the web page storage device enable the calling party device to send instructions to the conversion device and the conversion device to the calling party to initiate communications with the called party.

10. The system of claim 1 in which the conversion device can handle data to and from the calling party device and can also handle data to and from the switch.

11. The system of claim 1 in which the switch hosts the user account of the calling party, the call forwarding settings are those of that user account and in which the switch uses the instructions from the conversion device to alter the calling party's user account.

12. The system of claim 1 in which an ISP hosts the user account of the calling party and the conversion device can access each user account controlled by the ISP, the switch is part of an ISP infrastructure that controls the calling party's user account and the conversion device is part of an ISP infrastructure that controls the calling party's user account.

13. The system of claim 1 in which the conversion device resides in a secure internet server and includes the web pages storage device and the dynamic line assignment module.

14. The system of claim 1 in which the command to dial the call-in phone number has the form: wtai://wp/mc;CallIn-Number.

15. The system of claim 1 in which the conversion device can interface with another conversion device to set up a chain of conversion devices in order to link the calling party to the called party.

16. The system of claim 1 in which the calling party device is a mobile telephone capable of accessing the internet and in which the mobile telephone includes a browser but is not directly capable of dialing a VoIP user name.

17. The system of claim 1 in which the command to dial the call-in phone number has the form: wtai://wp/mc;CallIn-Number.

18. A method of enabling a calling party to communicate with a called party over a communications network, the method comprising:
   (a) sending, over the internet, web pages to a calling party device, the web pages including a data entry screen into which a user enters a required VoIP user name with which communication is sought;
   (b) receiving, at a conversion device, over the internet, from the calling party device, the VoIP user name;
   (c) dynamically assigning a call-in number to the calling party a free and unused call-in number that is not permanently associated with either the calling party or the called party, by automatically selecting that call-in number from a large group of possible call-in numbers;
   (d) altering call forwarding settings at a switch, such that a call from the calling party device to an assigned call-in number will be automatically forwarded to a device associated with the VoIP user name and in which the conversion device performs the following steps:

(i) extracts VoIP user name sent by the calling party device and converts the associated command into a language the switch understands;
(ii) sets-up a call forwarding of a dynamically assigned call-in phone number of the switch to such specific VoIP user name associated with a specific ISP user account;
(iii) then converts the dynamically assigned call-in phone number, which has been call forwarded to VoIP user name, into a command to dial that call-in phone number, in a form that the calling party device web browser understands;
(iv) sends that command to dial that call-in phone number to the calling party device in the form of a specific web page with that command embedded in it, so that the calling party only has to click on a web page link to cause the calling party device to automatically dial the call-in phone number, which is embedded in the command associated with the web page link.

* * * * *